US008836285B2

(12) United States Patent
Yamada et al.

(10) Patent No.: US 8,836,285 B2
(45) Date of Patent: Sep. 16, 2014

(54) POWER MANAGEMENT SYSTEM

(75) Inventors: Ken Yamada, Kobe (JP); Takeshi Nakashima, Kobe (JP); Hayato Ikebe, Osaka (JP); Souichi Sakai, Katano (JP); Yasuo Okuda, Yawata (JP); Takuji Sugata, Hirakata (JP); Toshiya Iwasaki, Osaka (JP); Youichiro Nishikawa, Katano (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 315 days.

(21) Appl. No.: 13/416,847

(22) Filed: Mar. 9, 2012

(65) Prior Publication Data
US 2012/0212183 A1 Aug. 23, 2012

Related U.S. Application Data

(63) Continuation of application No. PCT/JP2011/004667, filed on Aug. 23, 2011.

(30) Foreign Application Priority Data

Aug. 23, 2010 (JP) .................................. 2010-186226
Mar. 25, 2011 (JP) .................................. 2011-067379

(51) Int. Cl.
H02J 7/00 (2006.01)
H02J 3/32 (2006.01)
H02J 3/38 (2006.01)
H02J 7/35 (2006.01)

(52) U.S. Cl.
CPC .... H02J 3/32 (2013.01); H02J 3/38 (2013.01); H02J 7/35 (2013.01); H02J 7/007 (2013.01); H02J 7/0022 (2013.01)
USPC ............................................. 320/126; 307/48

(58) Field of Classification Search
USPC ............ 320/126, 124, 128, 134, 135; 307/48
See application file for complete search history.

(56) References Cited

U.S. PATENT DOCUMENTS

| 6,060,864 | A | * | 5/2000 | Ito et al. ......................... 320/136 |
| 6,064,179 | A | * | 5/2000 | Ito et al. ......................... 320/128 |
| 6,377,028 | B1 | * | 4/2002 | Armstrong et al. ........... 320/136 |
| 7,002,265 | B2 | * | 2/2006 | Potega ............................ 307/149 |
| 2001/0000423 | A1 | * | 4/2001 | Fischer et al. ................. 320/114 |
| 2003/0117112 | A1 | * | 6/2003 | Chen et al. .................... 320/137 |

(Continued)

FOREIGN PATENT DOCUMENTS

| JP | 2008-067469 A | 3/2008 |
| JP | 2008-109840 A | 5/2008 |
| JP | 2008-136259 A | 6/2008 |

*Primary Examiner* — Yalkew Fantu
(74) *Attorney, Agent, or Firm* — Marvin A. Motsenbocker; MOTS Law, PLLC

(57) ABSTRACT

Provided is a power management system capable of controlling charge and discharge of storage batteries according to power requirement of load even when handling electric power of large scale. A system controller receives load-related information data including the power requirement of load and storage battery-related information data including a state of a storage battery assembly including multiple storage batteries and creates an overall charge-discharge control instruction for the entire power management system based on the load-related information data and the storage battery-related information data. A hierarchical charge-discharge control apparatus receives the overall charge-discharge control instruction from the system controller and performs charge-discharge control of the multiple storage batteries, classified into hierarchical levels, on a hierarchical level basis.

20 Claims, 15 Drawing Sheets

(56) References Cited

U.S. PATENT DOCUMENTS

| | | | |
|---|---|---|---|
| 2003/0141850 A1* | 7/2003 | Dotzler et al. | 320/137 |
| 2005/0035741 A1* | 2/2005 | Elder et al. | 320/116 |
| 2009/0115252 A1* | 5/2009 | Caraghiorghiopol et al. | 307/48 |
| 2010/0096918 A1 | 4/2010 | Sawada et al. | |
| 2010/0097033 A1* | 4/2010 | Tange | 320/116 |

* cited by examiner

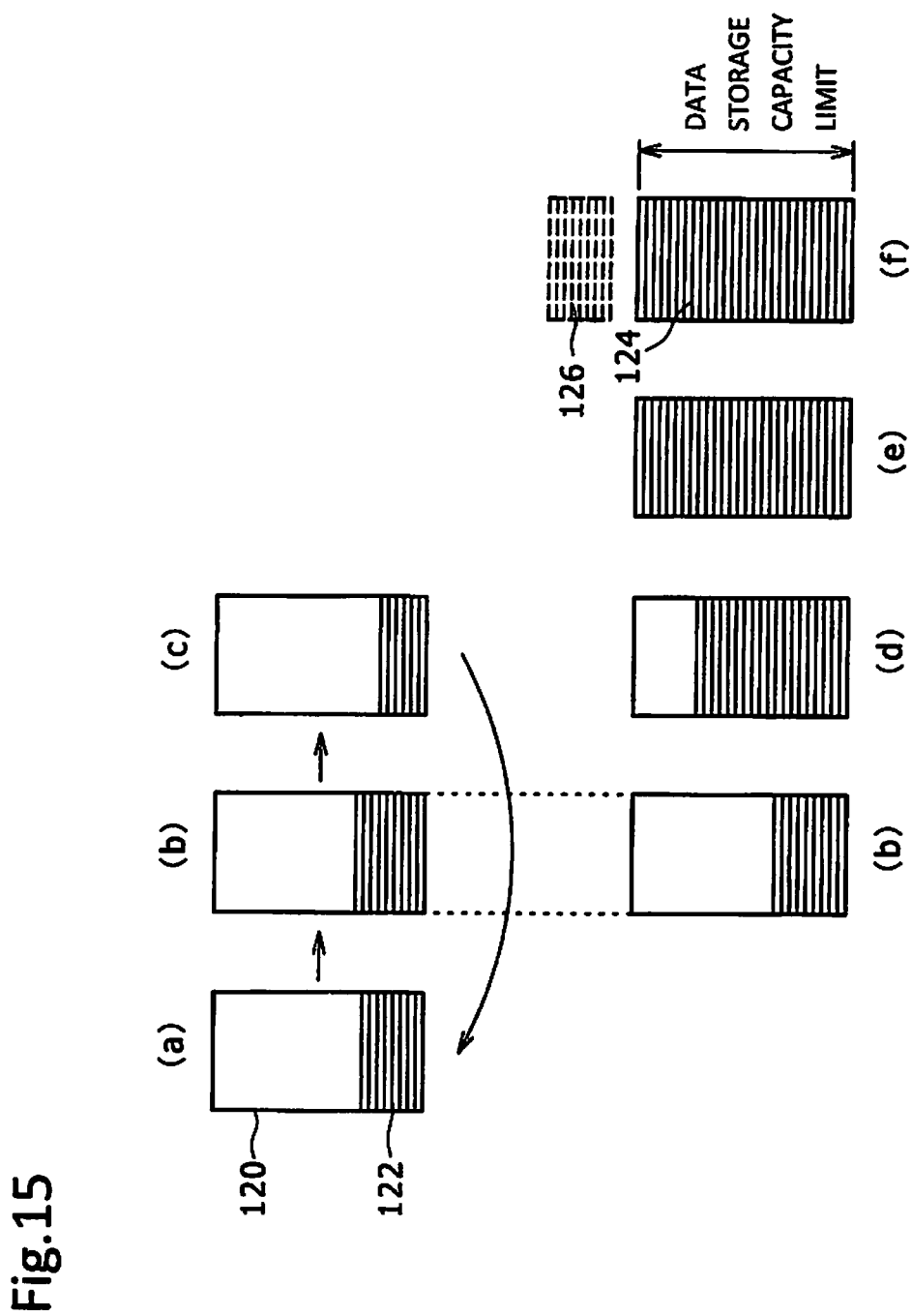

POWER MANAGEMENT SYSTEM

CROSS REFERENCE TO RELATED APPLICATIONS

This application is a continuation application of International Application No. PCT/JP2011/004667, filed on Aug. 23, 2011, entitled "POWER MANAGEMENT SYSTEM", which claims priority based on Article 8 of Patent Cooperation Treaty from prior Japanese Patent Applications No. 2010-186226, filed on Aug. 23, 2010, entitled "POWER MANAGEMENT SYSTEM", and No. 2011-067379, filed on Mar. 25, 2011, entitled "POWER MANAGEMENT SYSTEM", the entire contents of which are incorporated herein by reference.

BACKGROUND OF THE INVENTION

1. Field of the Invention

The invention relates to a power management system and, more specifically, relates to a power management system controlling charge and discharge of storage batteries according to power requirement of loads.

2. Description of Related Art

In electric power management, it is preferable to generate and transmit electric power efficiently according to power consumption of loads. Japanese Patent Application Publication No. 2008-136259 describes a power supply system for a network system. The power supply system includes: multiple solar power generation and supply systems connected to a communication line; and an information source apparatus configured to measure weather information, such as amount of solar radiation, and transmitting the same to the solar power generation and supply systems. With use of the power supply system, load apparatus can be driven efficiently based on highly accurate prediction on the amount of power generation.

If the power consumption of the loads varies, the power consumption can reach excessively high peak power, leading to very high power demand in some cases, and the power supply cannot cover the peak power in some other cases. Storage battery devices can therefore be used to average the supplied and demanded power. The storage battery devices can be secondary batteries such as lithium ion batteries. Japanese Patent Application Publication No. 2006-140094 discloses a lithium ion battery management system which determines which of the charge and discharge states a lithium ion battery is in, based on measurement values of charge/discharge current and temperature of the lithium ion battery and power feeding information of the commercial power supply, and calculates the remaining capacity of the lithium ion battery.

SUMMARY OF THE INVENTION

By using such a storage battery device, the supplied and demanded power for the power consumption of the loads can be averaged. However, in a secondary battery such as a lithium ion battery, unit storage batteries called unit cells have an inter-terminal voltage of about 1 V to 4 V and a small charge/discharge current capacity. Accordingly, an assembled battery including multiple unit cells is used, and moreover, a large number of assembled batteries need to be combined depending on the power consumption of loads. For example, if a storage battery capacity of about 1 MWh is required to average the supplied and demanded power on a factory scale, it is necessary to use several hundreds of assembled battery packs each including several hundreds of lithium ion battery unit cells.

In such a manner, as the scale of electric power to be handled increases, the number of necessary storage batteries increases, and the power management such as charge-discharge control of the storage batteries becomes complicated.

An aspect of the invention provides a power management system that comprises: a system controller configured to receive load-related information data including the power requirement of a load and storage battery-related information data including the state of a storage battery assembly including a plurality of storage batteries and to create an overall charge-discharge control instruction for the entire power management system based on the load-related information data and the storage battery-related information data; and a hierarchical charge-discharge control apparatus configured to receive the overall charge-discharge control instruction from the system controller and to perform charge-discharge control of the plurality of storage batteries, which are classified into a plurality of hierarchical levels, on a hierarchical level basis.

BRIEF DESCRIPTION OF THE DRAWINGS

FIG. 15 is a view for explaining how to organize data which is not yet transmitted when the storage battery power management apparatus is broken.

DETAILED DESCRIPTION OF EMBODIMENTS

Figure 1:
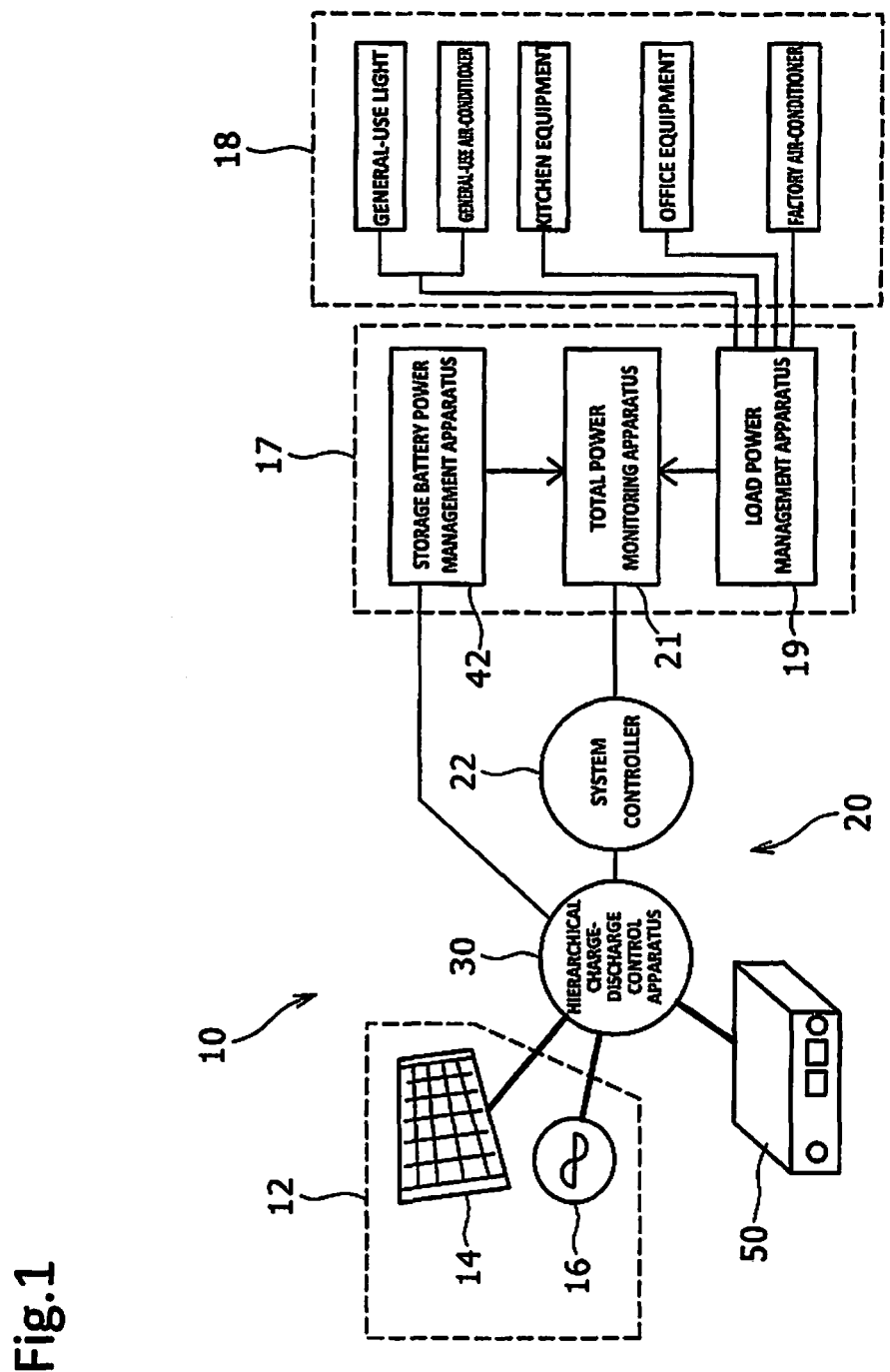
FIG. 1 is a view for explaining a configuration of a power management system of an embodiment.

Embodiments are described below in detail using the drawings. The following description is made using a lithium ion battery as a storage battery. The storage battery may be another secondary battery, for example, such as a nickel-hydrogen battery, a nickel-cadmium battery, or the like. Here, the storage battery is a storage battery assembly to obtain voltage and current for covering power requirements of the load. Accordingly, the number of storage battery unit cells constituting the storage battery assembly, the number of storage battery packs each including storage battery unit cells, the number of storage battery units each including storage battery packs, and the like can be properly selected according to the power specification or the like of the power management system.

Moreover, a solar power supply and an external commercial power supply are used as a power source in the following description. However, the embodiment can be carried out with another power source such as a wind-generated power supply, for example. The number, voltage, and power output of the power sources are just examples and can be properly selected according to the power specification or the like of the power management system. For example, only an external commercial power supply can be used as the power source.

In the following description, the same elements are given same reference numerals throughout all the drawings, and redundant description is omitted. Moreover, in the explanation of this specification, reference numerals described previously are used according to need. It should be noted that the drawings are schematic and dimensional proportions and the like are different from real ones. Accordingly, the specific dimensions should be determined with reference to the following description. Moreover, the drawings also include portions having different dimensional relationships and proportions from each other.

FIG. 1 is a view showing a configuration of factory facility 10 including solar power generation system 14 and storage battery assembly 50 as an embodiment of a facility provided with power management system 20. In this embodiment, the description is given of the factory facility. However, the embodiment is not limited to the factory facility and can be carried out in a wide variety of facilities requiring power management. Factory facility 10 includes solar power generation system 14 of several MW and external commercial power supply 16 as power source 12. Factory facility 10 includes factory load 18 such as general-use lights, general-use air-conditioners, kitchen equipment, office equipment including servers, PCs and the like, and factory air-conditioners. Power source 12 covers the power requirement of load 18. Factory facility 10 includes storage battery assembly 50 of several MWh in order to cope with variations in power consumption of factory load 18, variations in power generation by solar power generation system 14, and the like. Power management system 20 includes a function of optimally controlling the charge-discharge of storage battery assembly 50 based on the power requirement of load 18 and the state of storage battery assembly 50.

Power management system 20 includes storage battery assembly 50, power management apparatus 17, system controller 22, and hierarchical charge-discharge control apparatus 30. Power management apparatus 17 includes load power management apparatus 19 managing electric power on the load side, and storage battery power management apparatus 42 managing electric power on the storage battery assembly side, and total power monitoring apparatus 21.

Figure 2:
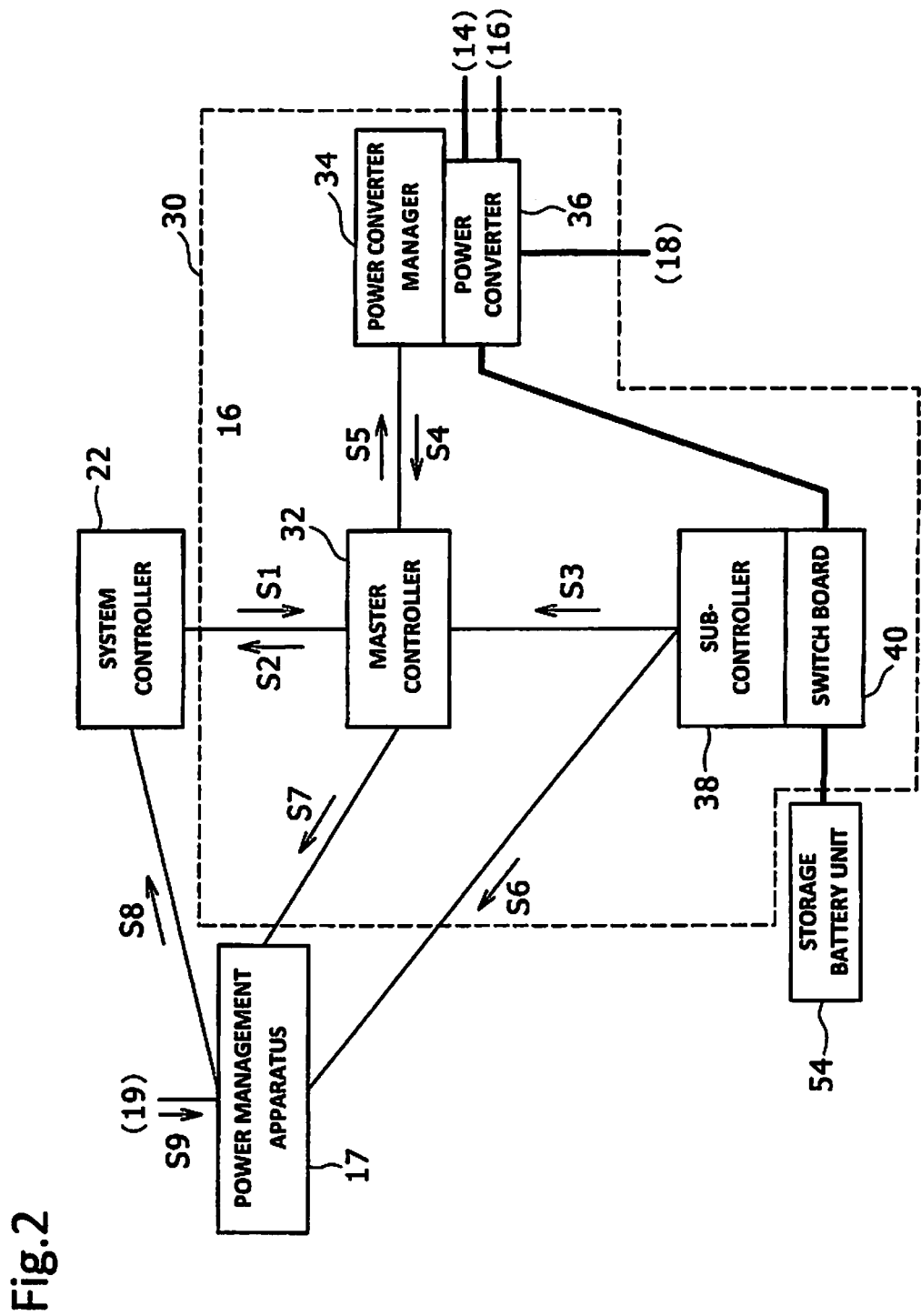
FIG. 2 is a diagram for explaining a relation among blocks constituting the power management system of the embodiment.

FIG. 2 is a diagram for explaining system controller 22 and an internal configuration of hierarchical charge-discharge control apparatus 30. In FIG. 2, thick solid lines indicate flow of electric power, and thin solid lines with arrows on the side thereof indicate flow of signals. S1 to S9 indicate types of signals.

Power source 12 includes external commercial power supply 16 and solar power generation system 14 as described above. External commercial power supply 16 is a single- or three-phase alternating current power supply. As external commercial power supply 16, a combination of electric power generated by various power generation systems, such as hydraulic power generation, nuclear power generation, and thermal power generation is fed from an external power company according to variations in power supply and demand. Solar power generation system 14 is a large-scale system of several MW herein as described above.

Storage battery assembly 50 includes a large number of lithium ion storage cells assembled into a scale of several MWh as described above. Storage battery assembly 50 has a hierarchical structure as follows: storage battery assembly 50 includes eight unit groups, each including five storage battery units (40 units in total); each storage battery unit includes 20 storage battery packs (800 packs in total); and each storage battery pack includes about 300 storage battery unit cells (about 240,000 cells in total) as described later. The details of the hierarchical structure are described later using FIGS. 3 and 4.

Load power management apparatus 19 is an apparatus having a function of acquiring load-related information data concerning power requirements of load 18. If load 18 of factory facility 10 is categorized in four systems, load power management apparatus 19 can be internally considered as an assembly of load power management apparatuses for the four systems.

System controller 22 is a controller having a function of, upon receiving power management information S8 transmitted from power management apparatus 17, transmitting overall charge-discharge control instruction S1 which is a single charge-discharge control instruction for entire power management system 20 to hierarchical charge-discharge control apparatus 30. Specifically, system controller 22 transmits overall charge-discharge control instruction S1 to master controller 32. As for power management information S8, total power monitoring apparatus 21 described in FIG. 1 acquires load-related information data S9 from load power management apparatus 19 and acquires storage battery-related information data including state data of storage battery assembly 50 from storage battery power management apparatus 42. System controller 22 then extracts data necessary for charge-discharge control from the acquired data. The extracted data is transmitted from total power monitoring apparatus 21 of power management apparatus 17 to system controller 22 as power management information S8.

Load-related information data S9 is necessary for system controller 22 to set the overall charge-discharge control instruction and concerns the entire power requirement of load 18. The storage battery-related information data constituting power management information S8 includes information of storage battery units 54 which is necessary for charge-discharge control of the storage battery units 54. Such state information includes the voltage, temperature, current, and state of charge SOC of each of storage battery packs constituting each storage battery unit 54, for example. The storage battery-related information data includes information concerning faults related to the settings of the overall charge-discharge control instruction. For example, when one of eight power converters 36 corresponding to the eight unit groups of storage battery assembly 50 has a fault such as a failure, or when one of five storage battery units 54 constituting each unit group of storage battery assembly 50 has a fault, the storage battery-related information data of the faulty one is transmitted. Power management information S8 including the storage battery-related information data is transmitted, for example, once a second.

System controller 22 generates overall charge-discharge control instruction S1 using power management information S8 based on load-related information data S9 and the storage battery-related information data. Specifically, in consideration of the states of storage battery units 54, switchboards 40, and power converters 36, system controller 22 calculates the charge-discharge state satisfying the entire power requirement of load 18 based on the charge/discharge capacity of storage battery assembly 50. System controller 22 then transmits the calculated charge-discharge state to master controller 32 as overall charge-discharge control instruction S1. Preferably, system controller 22 calculates the charge-discharge state satisfying the entire power requirement of load 18 based on the charge/discharge capacity of storage battery assembly 50 also in consideration of the charge/discharge capacity of storage battery unit 54 connected to faulty power converter 36 and information concerning the charge/discharge capacity of faulty storage battery unit 54. System controller 22 then transmits the calculated state to master controller 32 as overall charge-discharge control instruction S1.

Overall charge-discharge control instruction S1 transmitted to master controller 32 includes charge-discharge conditions represented by the amount of electric power and time such as "charge at XX kW for YY sec", for example. This is just an example, and the charge-discharge conditions may be "charge XX kW to a voltage of ZZ V" by specifying a maximum charge voltage or may be "discharge to a voltage of ZZ V" by specifying the minimum discharge voltage. Alternatively, charge and discharge may be sent with the SOC being specified. Herein, the SOC indicates the state of charge at each storage state of electric power by percent with the SOC being set to 100 when the electric power is fully stored.

Overall charge-discharge control instruction S1 is transmitted only when necessary. Overall charge-discharge control instruction S1 cannot be transmitted for a long period of time in some cases. In such a case, master controller 32 configured to receive overall charge-discharge control instruction S1 does not know whether system controller 22 is active in operation or non-active in non-operation.

Accordingly, activation check signal S2, which is a signal to check whether system controller 22 is in operation, is transmitted from master controller 32 to system controller 22 at appropriate intervals. System controller 22 sends a reply signal when being in operation. The appropriate intervals can be 10 minutes, for example. Master controller 32 can therefore check the state of system controller 22.

Here, system controller 22 is designed in consideration of system control for optimally using power source 12 including the solar power generation system 14 and the like, storage battery assembly 50, and various types of energy-saving equipment as the load.

Hierarchical charge-discharge control apparatus 30 is a controller configured to receive the single overall charge-discharge control instruction from system controller 22 and to control charge and discharge of the entire storage battery assembly 50 including about 240,000 storage battery unit cells as described above. Hierarchical charge-discharge control apparatus 30 includes: master controller 32; power converter manager 34 managing power converters 36, which is described later; and sub-controllers 38 managing storage battery assembly 50 on a storage battery unit 54 basis.

Master controller 32 is a controller having a function of, based on the one overall charge-discharge control instruction received from system controller 22, transmitting assembly charge-discharge control instruction S5 for each power converter 36 to power converter manager 34.

Master controller 32 receives power converter management data S4 as the state data of power converters 36 from power converter manager 34 and receives unit state data S3 as the state data of each storage battery unit 54 from the corresponding sub-controller 38. Based on received power converter management data S4 and unit state data S3, master controller 32 determines whether overall charge-discharge control instruction S1 transmitted from system controller 22 can be executed directly. Master controller 32 then transmits assembly charge-discharge control instruction S5 to power converter manager 34 based on the result of the determination. The determination can be performed by applying the unit state data and the like to predetermined conditions, for example. Assembly charge-discharge control instruction S5 is transmitted and received with a period of 100 msec, and power converter management data S4 and unit state data are transmitted and received with a period of 1 sec, for example.

Overall charge-discharge control instruction S1 is a single command to master controller 32, and assembly charge-discharge control instruction S5 is a set of commands separated for power converters 36, respectively. If power converter manager 34 is provided for eight power converters 36, for example, and if overall charge-discharge control instruction S1 includes "discharge 320 kW for 1800 sec", assembly charge-discharge control instruction S5 is "first power converter 36 discharges 40 kW, second power converter 36 discharges 40 kW, . . . , and eighth power converter 36 discharges 40 kW". In this example, the individual commands of assembly charge-discharge control instruction S5 indicate the values obtained by equally dividing the value in the command of the overall charge-discharge control instruction S1 by the number of power converters 36. However, the individual commands can indicate values other than the above value. When power converter management data S4 indicates that one of eight power converters 36 managed by power converter manager 34 is faulty, assembly charge-discharge control instruction S5 indicating that part of charge and discharge in the overall charge-discharge control instruction is limited is transmitted to power converter manager 34.

Specifically, as described later, power converter management data S4 includes information indicating a fault of any of power converters 36, and unit state data S3 includes information indicating a fault of any of storage battery units 54. Master controller 32 creates assembly charge-discharge control instruction S5 to control each power converter 36 so that the charge-discharge state required by overall charge-discharge control instruction S1 can be satisfied by storage battery units 54 other than faulty storage battery unit 54 among storage battery units 54 connected to power converters 36 other than faulty power converter 36. Master controller 32 outputs created assembly charge-discharge control instruction S5 to power converter manager 34.

Master controller 32 transmits data including the same contents as those of power converter management data S4, which is received from power converter manager 34, at the same transmission period to storage battery power management apparatus 42 through master controller 32 as power converter management data S7. Sub-controller 38 transmits data including the same contents as those of unit state data S3 transmitted to master controller 32, at a predetermined transmission period to storage battery power management apparatus 42 as unit state data S6 for storage battery power management apparatus 42. Herein, the predetermined transmission period is described specifically. If unit state data S3 is transmitted every one second, unit state data S6 is configured to be transmitted every 10 seconds. In such a case, unit state data S6 includes information of ten sets of unit state data S3. The transmission period may be of course another period. The transmission period of unit state data S3 may be the same as that of unit state data S6.

Storage battery power management apparatus 42 receives power converter management data S7 and unit state data S6 and then extracts information required to output the charge-discharge control instruction from the information of data S7 and S6. Storage battery power management apparatus 42 outputs the extracted information to system controller 22 as the storage battery-related information data included in power management information S8.

FIG. 2 shows master controller 32 in comparison with sub-controller 38. Sub-controller 38 performs charge-discharge control of one of storage battery units 54 including twenty storage battery packs 56. Master controller 32 is named in light of integrally managing all sub-controllers 38 which are basic units for the charge-discharge control.

Power converter manager 34 includes a function of receiving assembly charge-discharge control instruction S5 from master controller 32 and managing operations of eight power converters 36. The number of power converters 36 is not necessarily eight. In a simple system, power converter manager 34 can be configured to manage one power converter 36.

Power converters 36 have functions of electric power conversion between AC power of external commercial power supply 16 and DC power of the storage battery unit cells, voltage conversion between voltage of solar power generation system 14 and the voltage of the storage battery unit cells, or voltage conversion between the voltage of the storage battery unit cells and the voltage of load 18. Power converters 36 are converters such as two-way AC/DC converters, two-way DC/DC converters, and the like. Specifically, the types of the converters are selected according to the conversion actually carried out.

Power converter manager 34 has a function of controlling the operations of power converters 36 to perform power management. The power management is to once store electric power of the power source 12 in storage battery assembly 50 and discharge the stored electric power in load 18. Furthermore, power converter manager 34 has a function of bringing the operation of faulty power converter 36 into standby state and notifying master controller 32 of information indicating the fault of power converter 36 as power converter management data S4 when any one of eight power converters 36 has a fault or when an instruction to forbid charge/discharge or a stand-by instruction is issued from master controller 32.

Figure 3:
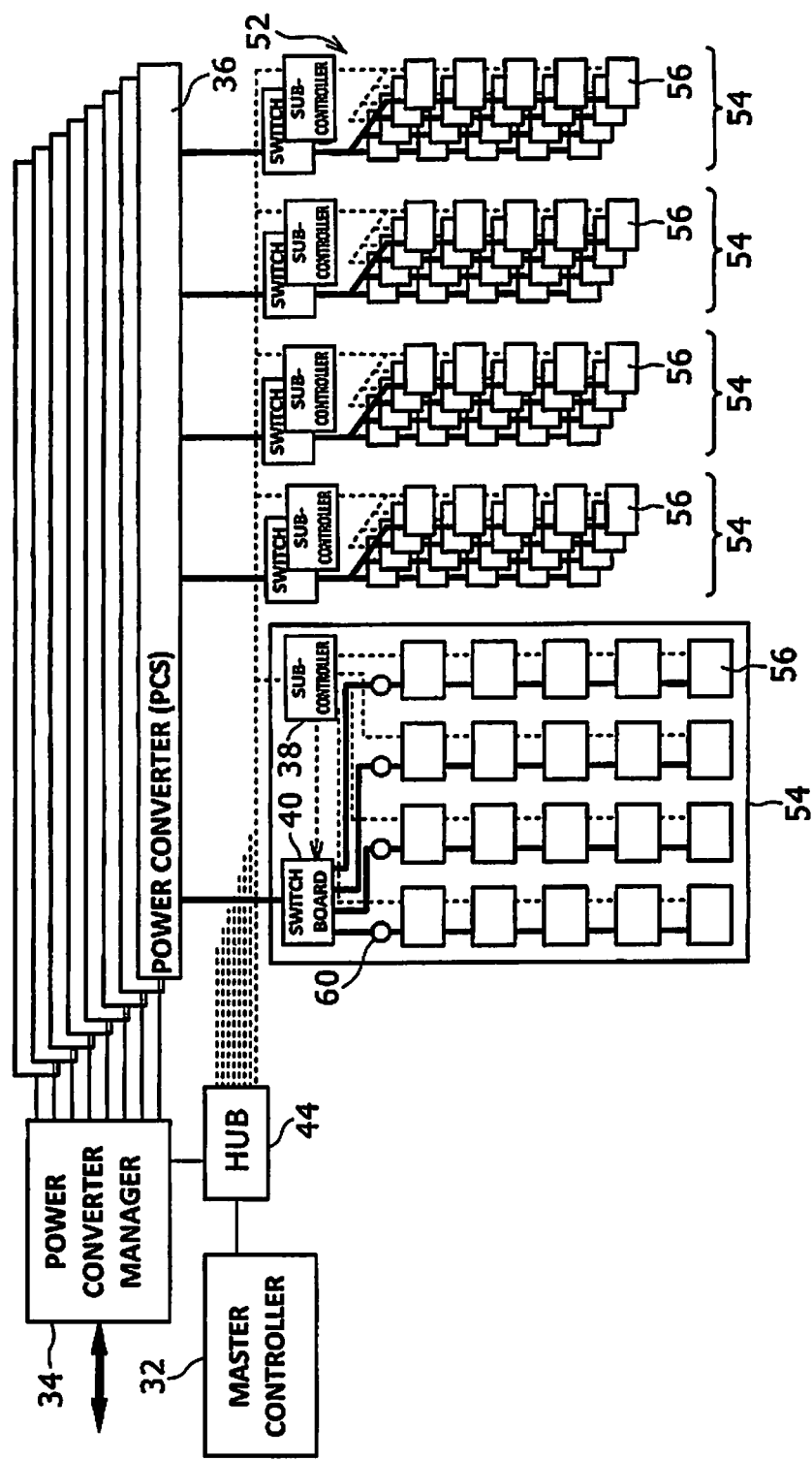
FIG. 3 is a view for explaining a hierarchy of a storage battery assembly of the power management system of the embodiment.

FIG. 3 is a view for explaining a hierarchy of storage battery assembly 50 of power management system 20. The electric power lines are indicated by thick solid lines, and the signal lines are indicated by dashed lines. As shown here, in power converter manager 34, storage battery assembly 50 is divided into eight groups, to which power converters 36 are individually assigned for power management. The eight groups of storage battery assembly 50 are called unit groups 52. Each of unit groups 52 includes five storage battery units 54 as described above.

In other words, a total of 40 storage battery units 54 are divided by eight, and each five storage battery units 54 are integrally treated as one unit group 52. FIG. 3 shows connection between each power converter 36 and five storage battery units 54. Power converter manager 34 has a function of integrally controlling the eight pairs of power converters 36 and unit groups 52 which are associated with each other.

Each of sub-controllers 38 determines the state of corresponding storage battery unit 54 constituting storage battery assembly 50. In the presence of a fault, sub-controller 38 transmits a control instruction such as an instruction to disconnect faulty storage battery unit 54 from power converter 36 to corresponding switch board 40 according to the fault. Sub-controller 38 then transmits information indicating the fault of storage battery unit 54 to master controller 32 and storage battery power management apparatus 42 as unit state data S3 and S6. In the above example, in the presence of a fault, storage battery unit 54 is disconnected from power converter 36 according to the fault. However, a part of storage battery unit 54 may be disconnected. The part of storage battery unit 54 can be an entire line of storage battery packs 56 connected in series to a current detector 60.

Figure 4:
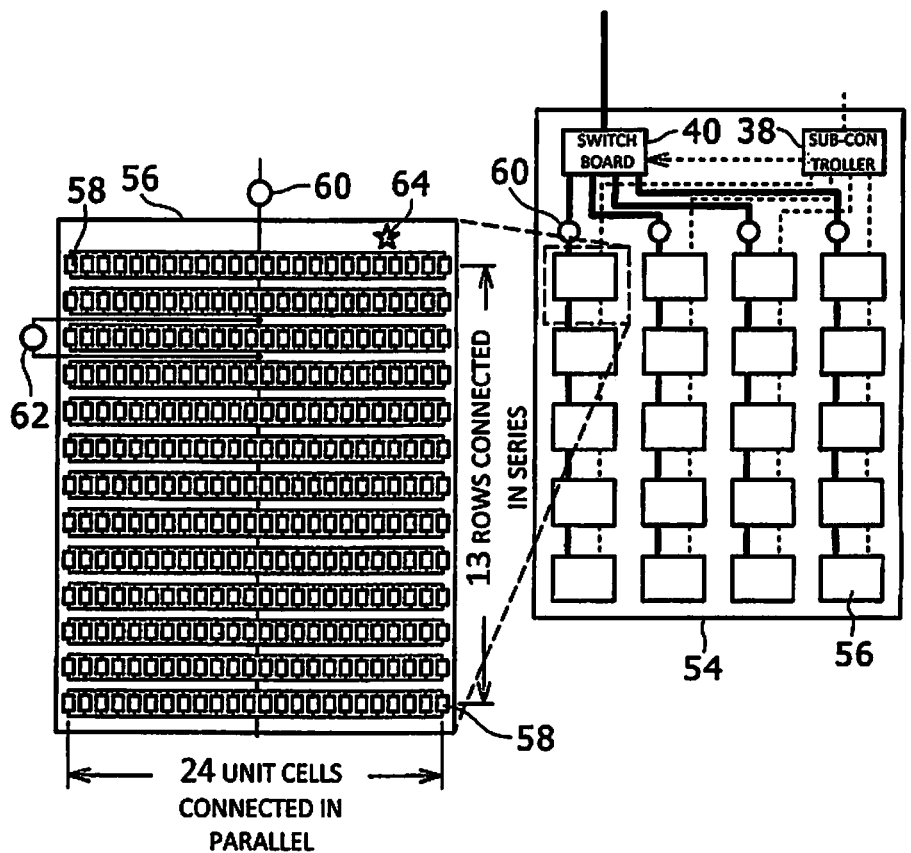
FIG. 4 is a view for explaining a relation among storage battery cells, storage battery packs, and storage battery units of the storage cell assembly of the embodiment.

FIG. 4 is a view showing the configuration of one of storage battery units 54 of FIG. 3 in detail. One storage battery unit 54 is composed a predetermined number of storage battery pack lines connected in parallel. Each storage battery pack line includes a predetermined number of storage battery packs connected in series. In the example of FIG. 4, five storage battery packs 56 are connected in series to form one storage battery pack line. Four storage battery pack lines are connected in parallel to constitute one storage battery unit 54. In short, each storage battery unit 54 includes 20 storage battery packs 56.

FIG. 4 includes an enlargement view of the internal configuration of one of storage battery packs 56. In one storage battery pack 56, 24 storage battery unit cells 58 which are lithium ion battery unit cells are connected in parallel to form each row, and 13 rows are connected in series. In short, each storage battery pack 56 includes 312 (=24×13) storage battery unit cells 58.

The inter-terminal voltage of each of the 13 rows of storage battery pack 56 which are connected in series is detected as cell voltage by voltage detector 62. The temperature of storage battery pack 56 is detected by temperature detector 64 as a pack temperature. Such data is pack state data representing the state of each storage battery pack 56. The current of each storage battery pack row of each storage battery unit 54 is detected by current detector 60 as pack row current data. Preferably, each storage battery pack 56 is provided with multiple temperature detectors 64. In such a case, the storage battery pack 56 is determined to be abnormal if one of the temperature detectors 64 detects abnormal local temperature in the storage battery pack 56.

Each storage battery pack 56 includes one of sub-controllers 38 and one of switch boards 40. Switch board 40 is provided with switches each for one of the storage battery pack rows. Each of the total four switches is placed between the power converter 36 corresponding to storage battery unit 54 and the corresponding storage battery pack row. The switch is opened or closed under the control of sub-controller 38.

Sub-controller 38 acquires the pack state data and pack row current data. Sub-controller 38 performs a process of disconnecting a storage battery pack row which includes a faulty one of storage battery packs 56 from power converter 36. Sub-controller 38 transmits the presence of a fault together with the pack state data and pack row current data as unit state data S3 and S6 to master controller 32 and storage battery power management apparatus 42 as described above if necessary. The fault determination can be performed by comparing the data with predetermined conditions in the following manner. Storage battery pack 56 is determined to be faulty if the pack raw current detected by current detector 60 is higher than a threshold calculated by a predetermined conditional expression, if the cell voltage detected by voltage detector 62 is not within a predetermined threshold range, or if the pack temperature detected by temperature detector 64 is higher than a predetermined threshold.

As described above, system controller 22 calculates the charge-discharge state satisfying the entire power requirement of load 18 in consideration of the charge/discharge capacity of faulty power converter 36 and storage battery unit 54 based on load-related information data S9 and power management information S8 including the storage battery-related information data as overall charge-discharge control instruction S1. Master controller 32 creates assembly charge-discharge control instruction S5 for individually controlling each power converter 36 in consideration of faulty electric converter 36 and storage battery unit 54 so as to satisfy the charge-discharge control instruction of overall charge-discharge control instruction S1 based on power converter management data S4 and unit state data S3. With such a control by hierarchical charge-discharge control apparatus 30 including master controller 32 and the like, system controller 22 can handle the functions of storage battery assembly 50 and hierarchical charge-discharge control apparatus 30 like a single battery even if there is a fault in power converters 36 or storage battery units 54.

Furthermore, power converter manager 34 performs the process of disconnecting faulty power converter 36 and storage battery units 54 connected thereto from others without control of system controller 22 and master controller 32 of the higher rank. Sub-controller 38 performs the process of disconnecting faulty storage battery unit 54 from others without control of system controller 22 and master controller 32 of the higher rank. By controlling each portion hierarchically without the control systems at the higher rank in such a manner, the processing burden on the control systems at the higher rank can be reduced, and power management system 20 can flexibly respond to changes of the system configuration.

Furthermore, after system controller 22 transmits one overall charge-discharge control instruction according to the needs, master controller 32 can collectively perform frequent charge/discharge monitoring and the charge-discharge control based on the monitoring for the entire system.

Figure 5:
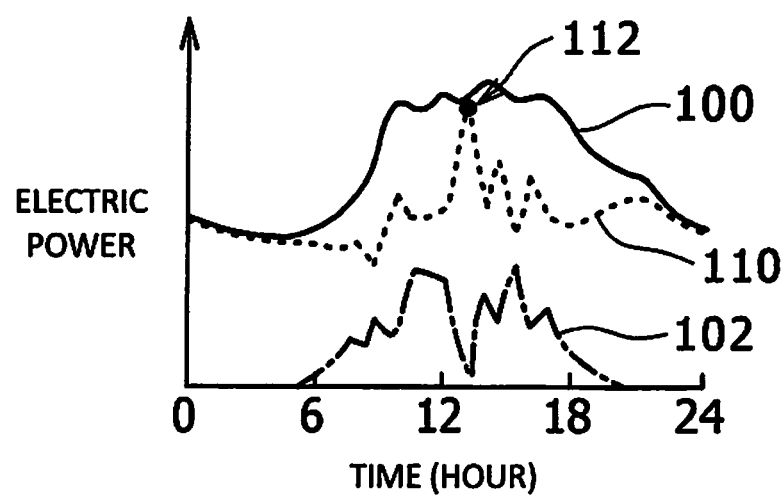
FIG. 5 is a diagram for explaining a case where power requirement of the loads is covered with external commercial power and solar power without using the storage battery assembly for the purpose of explaining a function of the storage battery assembly of the power management system of the embodiment.
Figure 6:
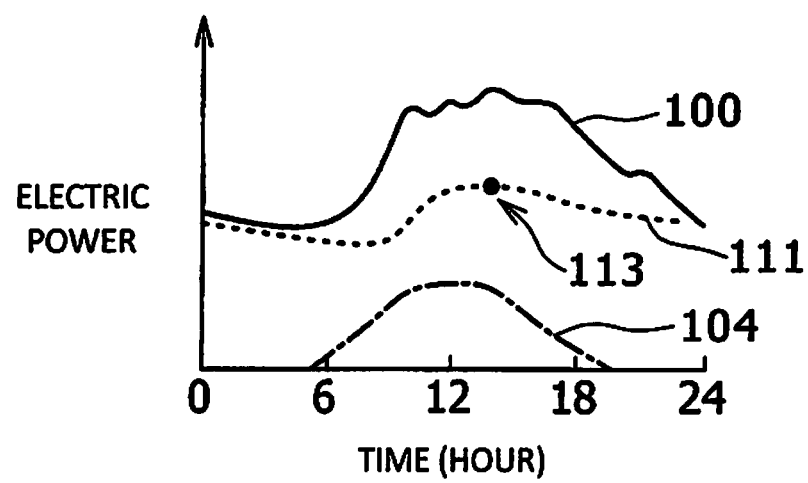
FIG. 6 is a diagram for explaining a case where power requirement of the loads is covered with external commercial power and solar power by appropriate charge-discharge control using a storage battery assembly.

FIGS. 5 and 6 show diagrams for explaining the effect of using storage battery assembly 50 as an example of the operation of power management system 20 of the above-described configuration. Herein, power source 12 of power management system 20 includes solar power generation system 14 and external commercial power supply 16 as described above. Load 18 includes general-use lights, general-use air-conditioners, kitchen equipment, office equipment, factory air-conditioners, and the like as described above. FIG. 5 is a diagram for explaining a case of satisfying load power requirement with the solar power of solar power generation system 14 and external commercial power of external commercial power supply 16 without using storage battery assembly 50. In contrast, FIG. 6 is a diagram for explaining a case of satisfying load power requirement with the external commercial power and solar power by proper charge-discharge control using storage battery assembly 50.

In each diagram, the horizontal axis shows time in a day, and the vertical axis shows electric power. The solid line indicates load electric power characteristic line 100. In FIG. 4, the dashed-dotted line indicates solar power characteristic line 102, and the broken line indicates external commercial power characteristic line 110. Herein, load electric power is intended to be covered with the solar power and external commercial power, and external commercial power value= (load power value−solar power value) at each time. The solar power value varies depending on sunshine. Accordingly, maximum value 112 of the external commercial power value is almost equal to the maximum value of the load electric power in the example of FIG. 5.

If the basic rate of external commercial power is determined by the maximum power value, for example, use of solar power generation system 14 does not contribute to reduction of the basic rate of the external commercial power so much as in the case of FIG. 5.

In FIG. 6 where storage battery assembly 50 is used, the variations in solar power with time is reduced by the proper charge-discharge control for storage battery assembly 50, and solar power characteristic line 104 indicated by a dashed-dotted line shows a smooth characteristic over time. External commercial electric power characteristic line 111 therefore shows a smooth characteristic, and maximum value 113 is considerably smaller than maximum value 112 of FIG. 5. By performing appropriate charge-discharge control using storage battery assembly 50 in such a manner, the maximum value of external commercial power is considerably reduced due to the solar power of solar power generation system 14, and for example, the basic rate of external commercial power can be reduced.

According to power management system 20, storage battery assembly 50 is controlled through one overall charge-discharge control instruction even if storage battery assembly 50 of large scale is provided according to solar power generation system 14 of large scale. The charge and discharge of storage battery assembly 50 can be easily controlled according to the power requirement of load 18.

In the above description, based on overall charge-discharge control instruction S1 transmitted from system controller 22, master controller 32 performs the subsequent charge-discharge control. Herein, if master controller 32 fails, charge-discharge control of the entire power management system 20 cannot be performed.

Master controller 32 has a high enough performance to perform the subsequent charge-discharge control based on overall charge-discharge control instruction S1. Sub-controller 38 does not have performance as high as master controller 32. However, sub-controller 38 is capable of performing charge-discharge control instead of master controller 32 if the control processing is performed at wider intervals.

Figure 7:
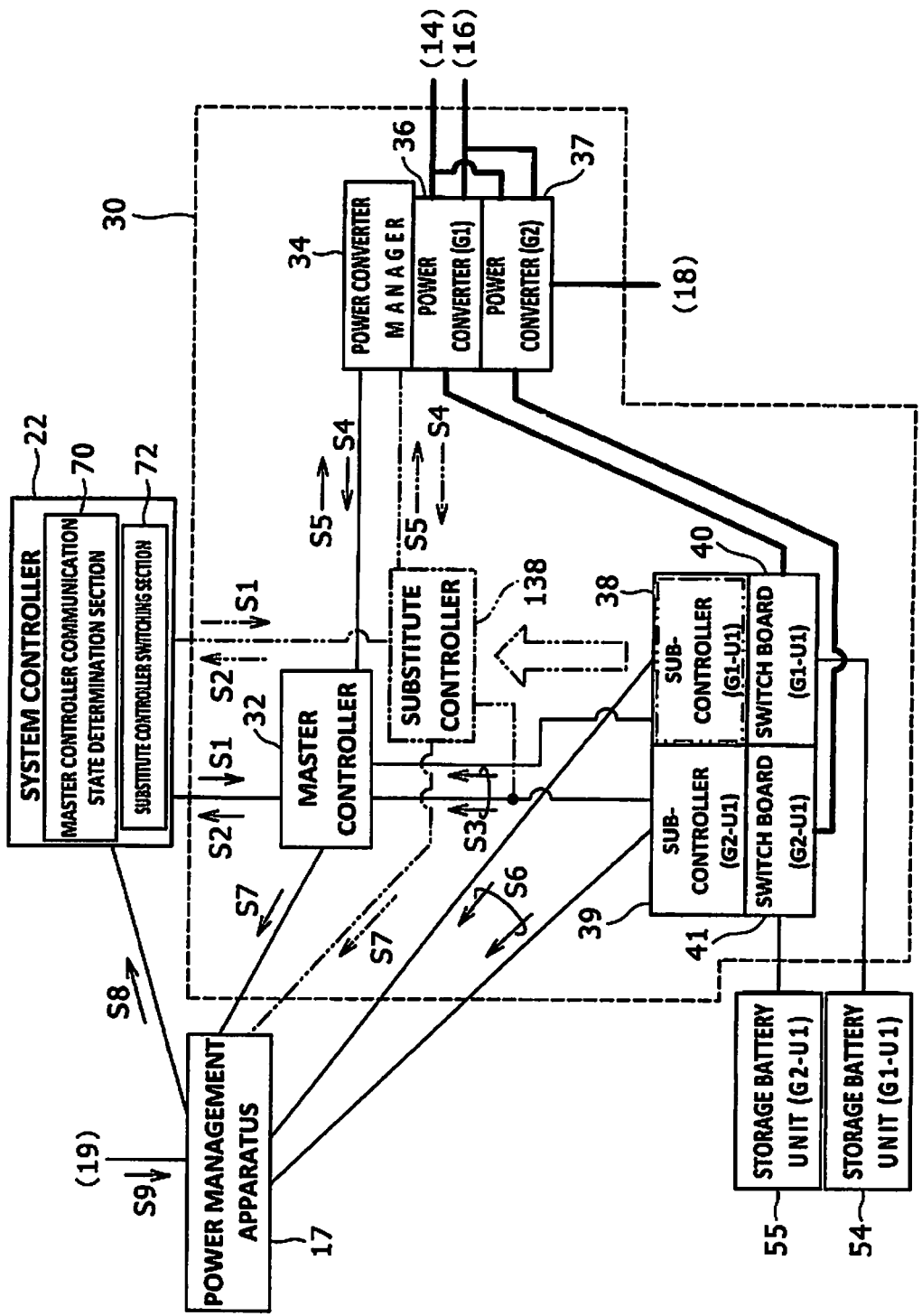
FIG. 7 is a diagram for explaining an alternative process performed when a master controller of the power management system of the embodiment is faulty.

First, a description is schematically given of the case where one of the sub-controllers is promoted and replaced for master controller 32. FIG. 7 corresponds to FIG. 2. FIG. 7 shows the power converters, the switch boards, the sub-controllers, and the storage battery units which are categorized into some groups. The groups correspond to the storage battery unit groups 52.

To be specific, the group including substitute controller 138 and the groups including the other sub-controllers 39 are respectively indicated by G1 and G2 to be distinguished. Power converter manager 34 manages eight power converters as described in FIG. 3. The number of groups including sub-controllers 39 other than substitute controller 138 is seven, and these groups are represented by group G2 in FIG. 7. Moreover, as described in FIG. 3, each power converter is connected to five storage battery units, which are represented by one storage battery unit in FIG. 7. In short, FIG. 7 schematically shows two power converters each connected to one of the storage battery units. The omission of FIG. 7 is just for explanation.

Group G1 includes power converter (G1) 36, sub-controller (G1-U1) 38 to serve as substitute controller 138, switch board (G1-U1) 40, and storage battery unit (G1-U1) 54.

Similarly, group G2 includes power converter (G2) 37, sub-controller (G2-U1) 39 not to serve as substitute controller 138, switchboard (G2-U1) 41, and storage battery unit (G2-U1) 55.

It is assumed herein that sub-controller (G1-U1) of G1 is promoted to substitute controller 138. The criterion for promoting one of the multiple sub-controllers to substitute controller 138 is described later.

When the sub-controller (G1-U1) is promoted to substitute controller 138, group G1 including the sub-controller (G1-U1) is short of one sub-controller. Accordingly, the storage battery unit (G1-U1) managed by the sub-controller (G1-U1) is excluded from the charge-discharge control. The number of storage battery units connected to the power converter (G1) is reduced to seven.

In such a manner, to promote one of the sub-controllers to substitute controller 138, the process of excluding the storage battery unit including the sub-controller to be promoted from the charge-discharge control is performed. After the process is performed, substitute controller 138 receives overall charge-discharge control instruction S1 from system controller 22 instead of master controller 32. Thereafter, the control intervals are widened according to the processing ability of substitute controller 138. Substitute controller 138 then transmits the assembly charge-discharge control instruction S5 to power converter manager 34. The contents of the subsequent control are the same as those described in relation to FIG. 2 other than the communication intervals in the steps S2 to S7 which change according to the increased control intervals.

The process of determining whether master controller 32 is faulty and the process of switching master controller 32 to substitute controller 138 are executed by system controller 22. As shown in FIG. 7, system controller 22 includes master controller communication state determination section 70 and substitute controller switching section 72.

Figure 8:
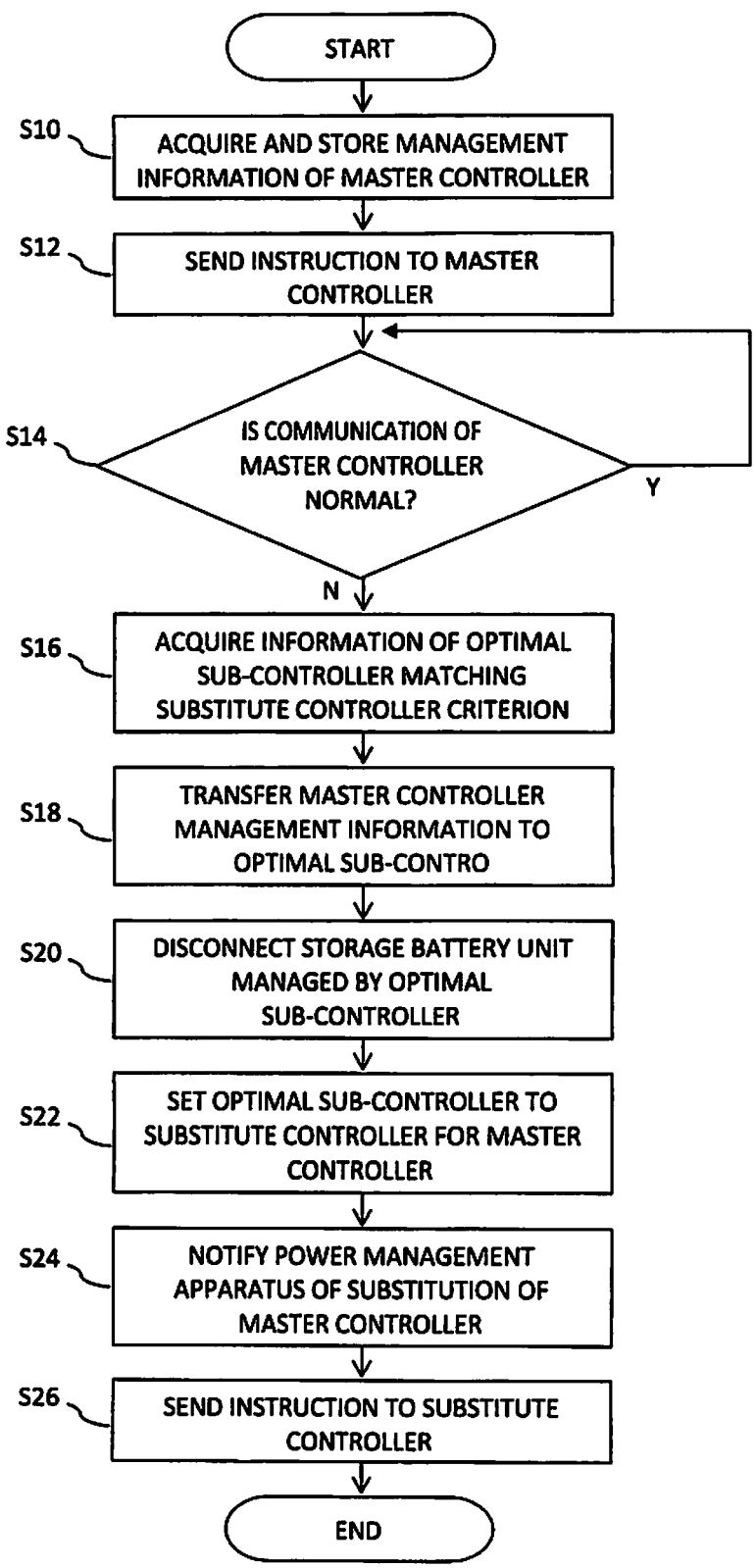
FIG. 8 is a flowchart for explaining an alternative procedure for FIG. 7.

The operation of the aforementioned configuration is described below using FIG. 8 focusing around the aforementioned function of system controller 22. FIG. 8 is a flowchart showing a procedure to allow one of the sub-controllers to be promoted to substitute controller 138 and perform charge-discharge control instead of master controller 32 when master controller 32 is faulty.

At first in the procedure, system controller 22 acquires management information of master controller 32 and stores the same (S10). Specifically, system controller 22 acquires and stores identification information concerning communication between power converter manager 34 and each sub-controller 38, a connecting relation between each sub-controller 38 and corresponding power converter 36, and the like. The above process, which is usually performed by system controller 22, is a necessary information acquisition process particularly when master controller 32 is substituted with substitute controller 138.

System controller 22 transmits overall charge-discharge control instruction 51 to master controller 32 (S12). This procedure is also usually performed by system controller 22. The response to step S12 is used as one of the means for determining whether the communication of master controller 32 is normal (S14).

At step S14, it is determined whether transmission and reception in communication performed by master controller 32 is normal. The processing procedure thereof is executed by the function of maser controller communication state determination section 70 of system controller 22.

If normally receiving overall charge-discharge control instruction S1 transmitted at step S12, master controller 32 transmits assembly charge-discharge control instruction S5 to power converter manager 34 at intervals of 100 msec. Master controller 32 receives power converter management data S4 from power converter manager 34 at intervals of 1 sec and transmits the same contents to power management apparatus 17 at intervals of 1 sec as power converter management data S7. In response, power management apparatus 17 transmits power management information S8 to system controller 22 at intervals of 1 sec. Accordingly, several seconds after transmitting overall charge-discharge control instruction S1, system controller 22 receives power management information S8 in response to the transmitted instruction S1. By monitoring the reception, it can be determined whether transmission and reception in communication performed by master controller 32 are performed normally.

The steps S12 and S14 show just an example of the procedure of determining whether transmission and reception in communication performed by master controller 32 are normally performed. In addition, master controller 32 performs communication transmission and reception at steps S1 to S5 and S7. Accordingly, whether master controller 32 is faulty can be determined by using one or some of the steps. Alternatively, in addition to the signals described in FIG. 2, it can be configured to transmit and receive signals allowing determination of abnormal communication of master controller 32.

Preferably, the determination at step S14 is performed by using a predetermined threshold margin period to judge whether transmission and reception in communication performed by master controller 32 remains abnormal for more than the threshold margin period. The threshold margin period can be set in consideration of the transmission and reception intervals of the communication to be used in the determination and the like. If the transmission and reception in the communication performed by master controller 32 remain abnormal for more than the threshold margin period, master controller 32 is determined to be faulty. In this term, the master controller communication state determination section 70 includes a master controller fault determination unit.

If the communication of master controller 32 is determined to be normal at step S14, the determination at step S14 is performed again at proper sampling intervals since master controller 32 is not faulty. If the communication of master controller 32 is determined to be abnormal at step S14, master controller 32 is faulty, and the procedure proceeds to step S16.

At step S16, system controller 22 acquires information of an optimal sub-controller matching the criterion for substitute controller 138. The information of the sub-controller is the identification information thereof. The criterion for substitute controller 138 is a criterion for finding specific substitute controller 138 and is also called a substitute specifying criterion. For example, by using the states of charge SOC of storage battery units 54, master controller 32 can be substituted with a sub-controller which manages storage battery unit 54 having the highest SOC.

As described above, storage battery unit 54 belonging to group G1 promoted to substitute controller 138 is excluded from charge-discharge control. Accordingly, it is preferable that such storage battery unit 54 is less likely to cause over discharge due to natural discharge. The storage battery unit 54 having a higher SOC is less likely to cause over discharge even when the storage battery unit is left untreated and is allowed to naturally discharge. Master controller 32 is therefore substituted with a sub-controller which manages storage battery unit 54 having the highest SOC. In the example of FIG. 7, the information of optimal sub-controller which agrees with the criterion for substitute controller 138 is acquired as G1-U1.

In such a manner, when specific sub-controller (G1-U1) optimal for substitute controller 138 is found, the management information of master controller 32 is transferred to sub-controller (G1-U1) (S18). The transferred management information is the management information acquired at step S10.

Subsequently, connection of storage battery unit (G1-U1) managed by optimal sub-controller (G1-U1) is shut off (S20). Specifically, the storage battery unit (G1-U1) is disconnected from the power converter (G1). The number of storage battery units connected to power converter (G1) becomes seven.

When the process at step S20 is terminated, optimal sub-controller (G1-U1) becomes substitute controller 138 substituted for faulty master controller 32 (S22). Power management apparatus 17 is then notified of the substitution (S24). The processing procedure at steps S16 to S24 is executed by the function of substitute controller switching section 72 of system controller 22. When master controller 32 is substituted with substitute controller 138 in such a manner, system controller 22 transmits overall charge-discharge control instruction S1 to substitute controller 138 (S26). Thereafter, substitute controller 138 performs charge-discharge control using increased control intervals.

Figure 9:
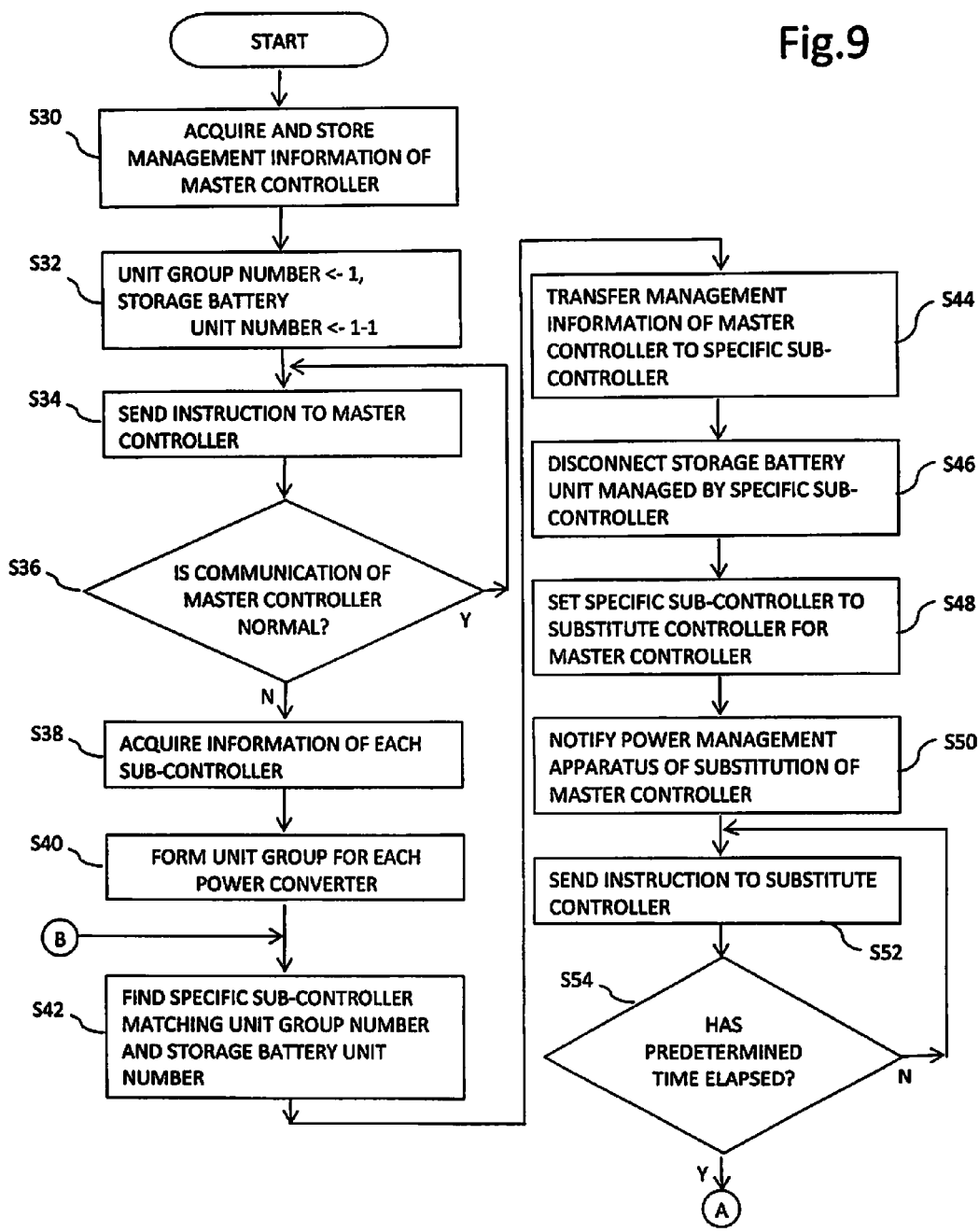
FIG. 9 is a flowchart for explaining a first half of another alternative procedure for FIG. 7.
Figure 10:
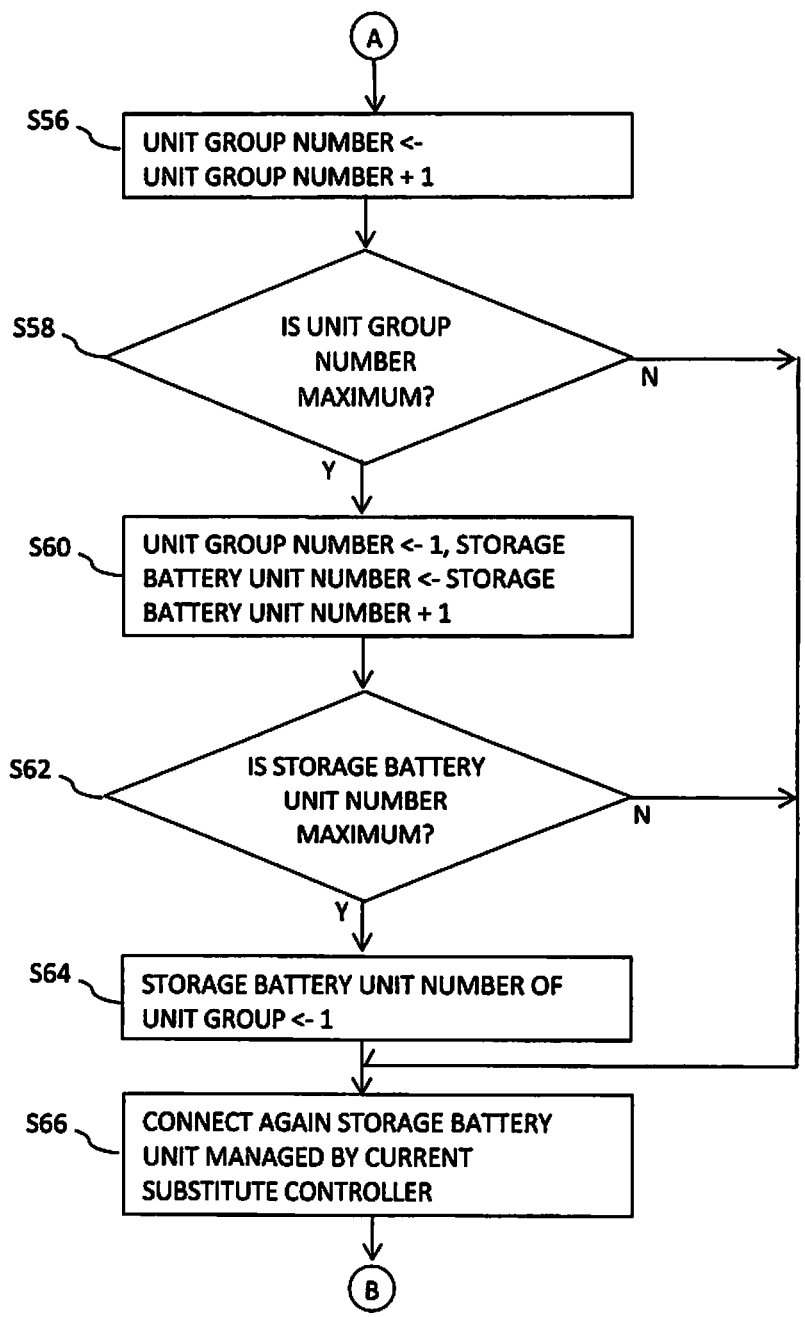
FIG. 10 is a flowchart for explaining a second half of the alternative procedure following the procedure of FIG. 9.

In FIG. 8, the substitute specifying criterion is the degree of charge SOC of the storage battery units managed by the sub-controllers. As another substitute specifying criterion, a predetermined order of rotation can be used. Faulty master controller 32 may be substituted with one of the multiple sub-controllers according to the predetermined order of rotation at each predetermined substitution period. FIGS. 9 and 10 are flowcharts showing a procedure of changing substitute controller 138 based on the above substitute specifying criterion.

Also in such a case, system controller 22 acquires and stores the management information of master controller 32 (S30). The processing procedure thereof is the same as that at step S10 of FIG. 8. In order to sequentially change substitute controller 138, a unit group number and a storage battery unit number are initialized (S32). To be specific, the unit group number is set to 1, and the storage battery unit number is set to 1-1. In FIG. 7, the unit number is G1, and the storage battery unit number is G1-U1.

System controller 22 transmits overall charge-discharge control instruction 51 to master controller 32 (S34) and determines whether communication of master controller 32 is normal (S36). This processing procedure is the same as that at steps S12 and S14 of FIG. 8. If master controller 32 is determined to be faulty as a result of the determination at step S36, the procedure proceeds to step S38.

System controller 22 acquires information of each sub-controller (S38) and makes unit groups corresponding to the power converters (S40). In FIG. 7, the sub-controllers are distinguished by the unit groups or are distinguished depending on to which groups the sub-controllers belong. In the example of FIG. 7, sub-controller (G1-U1) and sub-controller (G2-U1) are distinguished as members of groups G1 and G2, respectively.

By forming the unit groups or performing grouping in such a manner, the sub-controller corresponding to unit group number 1 and storage battery unit number 1-1, which are initialized at step S32, is identified (S42). In the example of FIG. 7, unit group number 1 indicates G1, and storage battery unit number 1-1 indicates G1-U1. Accordingly, the sub-controller corresponding thereto is sub-controller G1-U1. In other words, the sub-controller managing a storage battery unit having the smallest unit group number and the smallest storage battery unit number is identified at first as a specific sub-controller. This is the substitute specifying criterion for identifying the first substitute controller 138 in the case of FIG. 9.

After the specific sub-controller is identified in such a manner, system controller 22 transfers the management information of master controller 32 to the specific sub-controller (S44). This processing procedure is the same as that of step S18 of FIG. 8. The connection of the storage battery unit managed by the specific sub-controller is shut off (S46). This processing procedure is also the same as that of step S20 of FIG. 8.

After the processing of step S46 is terminated, specific sub-controller (G1-U1) becomes substitute controller 138 substituted for master controller 32 (S48). Power management apparatus 17 is notified of the substitution (S50). The processing procedure at steps S38 to S50 is executed by the function of substitute controller switching section 72 of system controller 22. When master controller 32 is substituted with substitute controller 138, system controller 22 transmits overall charge-discharge control instruction S1 to substitute controller 138 (S52). Thereafter, substitute controller 138 performs charge-discharge control using the control increased intervals.

It is then determined whether the predetermined period of time elapses (S54). The predetermined period of time is the predetermined substitution period at which substitute controller 138 is sequentially changed. Substitute controller 138 is not changed until the predetermined period of time elapses. After the predetermined period of time elapses, the unit group number is incremented by 1 (S56). The increment of 1 is to determine the order of rotation. The current substitute controller 138, which belongs to group G1, is replaced with a sub-controller of group G2 next.

When the unit group number is incremented by 1, it is determined whether the unit group number is the maximum (S58). In the current case, the unit group number is now 2, and the determination at step S58 is negative. The procedure proceeds to step S66. At step S66, the electric battery unit managed by current substitute controller 138 is connected again. In the example of FIG. 7, current substitute controller 138 is G1-U1. Accordingly, electric battery unit G1-U1 disconnected at step S46 returns to be connected to power converter (G1).

When the storage battery unit which is currently disconnected and is excluded from charge-discharge control returns to the original connection at step S66, the procedure returns to step S42. At step S42, sub-controller (G2-U1) corresponding to the unit group number incremented by 1 as the order of rotation is identified as the next specific sub-controller. The specific sub-controller is thus changed.

Subsequently, the processes at steps S44, S46, S48, and S50 are performed for next specific sub-controller (G2-U1) to cause specific sub-controller (G2-U1) to serve as next substitute controller 138. Overall charge-discharge control instruction S1 is transmitted from system controller 22 to substitute controller 138 (S52).

After the predetermined period of time for second substitute controller 138 elapses (S54), the unit group number is further incremented by 1 (S56). There are actually groups G1 to G8 although FIG. 7 shows only groups G1 and G2, and the unit group number becomes G3 at step S56. The determination whether the unit group number is the maximum (S58) is negative, and the procedure jumps to step S66. The specific sub-controller as third substitute controller 138 is thus determined.

The above processes are repeated, and the determination at step S58 is positive at the subsequent repetition after eighth substitute controller 138. If the determination at step S58 is positive, the unit group number is returned to 1, and the storage battery unit number is incremented by 1 (S60). Using the expressions of FIG. 7, substitute controller 138 substituted for master controller 32 is sequentially changed to sub-controllers (G1-U1), (G2-U1), (G3-U1), (G4-U1), (G5-U1), (G6-U1), (G7-U1), and (G8-U1) and is then sequentially changed to sub-controllers (G1-U2), (G2-U2), (G3-U2) . . . . After sub-controller (G8-U2), substitute controller 138 is changed to sub-controllers (G1-U3), (G2-U3), (G3-U3) . . . . When the above process is repeated up to sub-controller (G8-U5), all of 40 sub-controllers take turns serving substitute controller 138, and the first rotation is finished. Thereafter, substitute controller 138 is returned to sub-controller G1-U1 and is repeatedly changed.

In electric management system 20, when master controller 32 fails, one of the multiple sub-controllers 38 can be promoted to substitute controller 138 and can continue charge-discharge control instead of master controller 32.

In the above description, at creation of assembly charge-discharge control instruction S5 from overall charge-discharge control instruction S1, if any one of storage battery units 54 includes a fault, assembly charge-discharge control instruction S5 is created in consideration of the fault.

For example, it is assumed that overall charge-discharge control instruction S1 is "charge at 320 kW for 1800 sec". In this case, if none of storage battery units 54 connected to eight power converters 36 are faulty, assembly charge-discharge control instruction S5 to each electric converter 36 is "charge at 40 kW for 1800 sec" based on 320 kW/8=40 kW.

Herein, it is assumed that none of storage battery units 54 connected to seven of power converters 36 is faulty but one of five storage battery units 54 connected to eighth power electric converter 36 is faulty. Eighth power converter 36 has an electric power conversion ability of four fifths that of other power converters 36. In other words, the entire electric power conversion ability of eight power converters 36 decreases from 8 to 7.8. Accordingly, assembly charge-discharge control instruction S5 to each of seven power converters 36 is not changed as "charge at 40 kW for 1800 sec" according to the electric power conversion ability of power converters 36. Assembly charge-discharge control instruction S5 to eighth power converter 36 is "charge at 32 kW for 1800 sec" because 40 kW×0.8=32 kW.

If the electric power conversion ability of power converters 36 is not less than 40 kW, power converters 36 can be controlled as follows without changing the contents of overall charge-discharge control instruction S1. In the above example, the entire electric power conversion ability of eight electric converters 36 is 7.8. Accordingly, assembly charge-discharge control instruction S5 to each of seven power converters 36 is "charge at 41 kW for 1800 sec" because 320 kW/7.8=41 kW. Charge-discharge control instruction S5 to eighth power converter 36 is "charge at 33 kW for 1800 sec". Herein, 41 kW×7+33 kW=320 kW, and the contents of overall charge-discharge control instruction S1 are not changed.

Furthermore, if storage battery units 54 have enough charge-discharge ability, the contents of overall charge-discharge control instruction S1 does not need to be changed as follows. In other words, the charge assigned to each electric converter 36 is not changed even if there is faulty storage battery unit 54. In the above example, assembly charge-discharge control instruction S5 to eighth power converter 36 is "charge at 40 kW for 1800 sec" which is the same as the instruction to other power converters 36. As for seven power converters 36, five storage battery units 54 of each power converter 36 are not faulty, and each storage battery unit 54 covers a charge of 8 kW for 1800 sec. As for eighth power converter 36, four storage battery units 54 are not faulty, and each thereof bears 10 kW for 1800 sec because 40 kW/4=10 kW.

By previously knowing the electric power conversion ability and charge-discharge ability of power converters 36 and storage battery units 54, assembly charge-discharge control instruction S5 can be created without changing the contents of overall charge-discharge control instruction S1 in such a manner.

Figure 11:
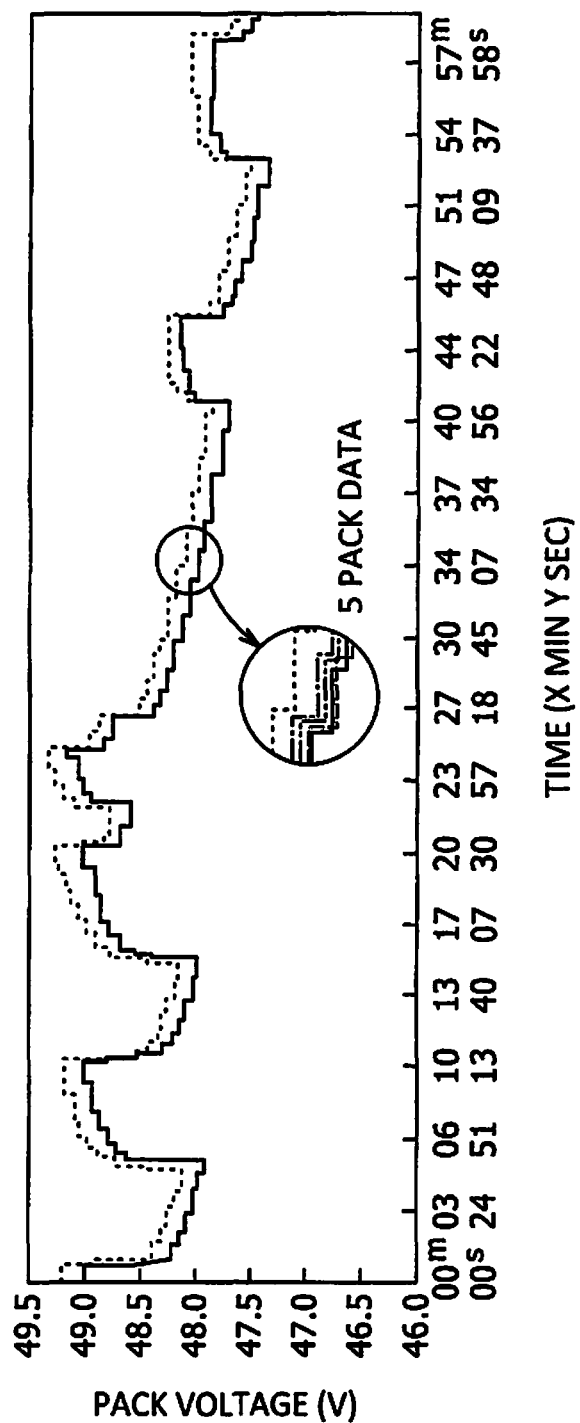
FIG. 11 is a diagram for explaining pack voltage of each of storage battery packs constituting a storage battery pack line in the embodiment.
Figure 12:
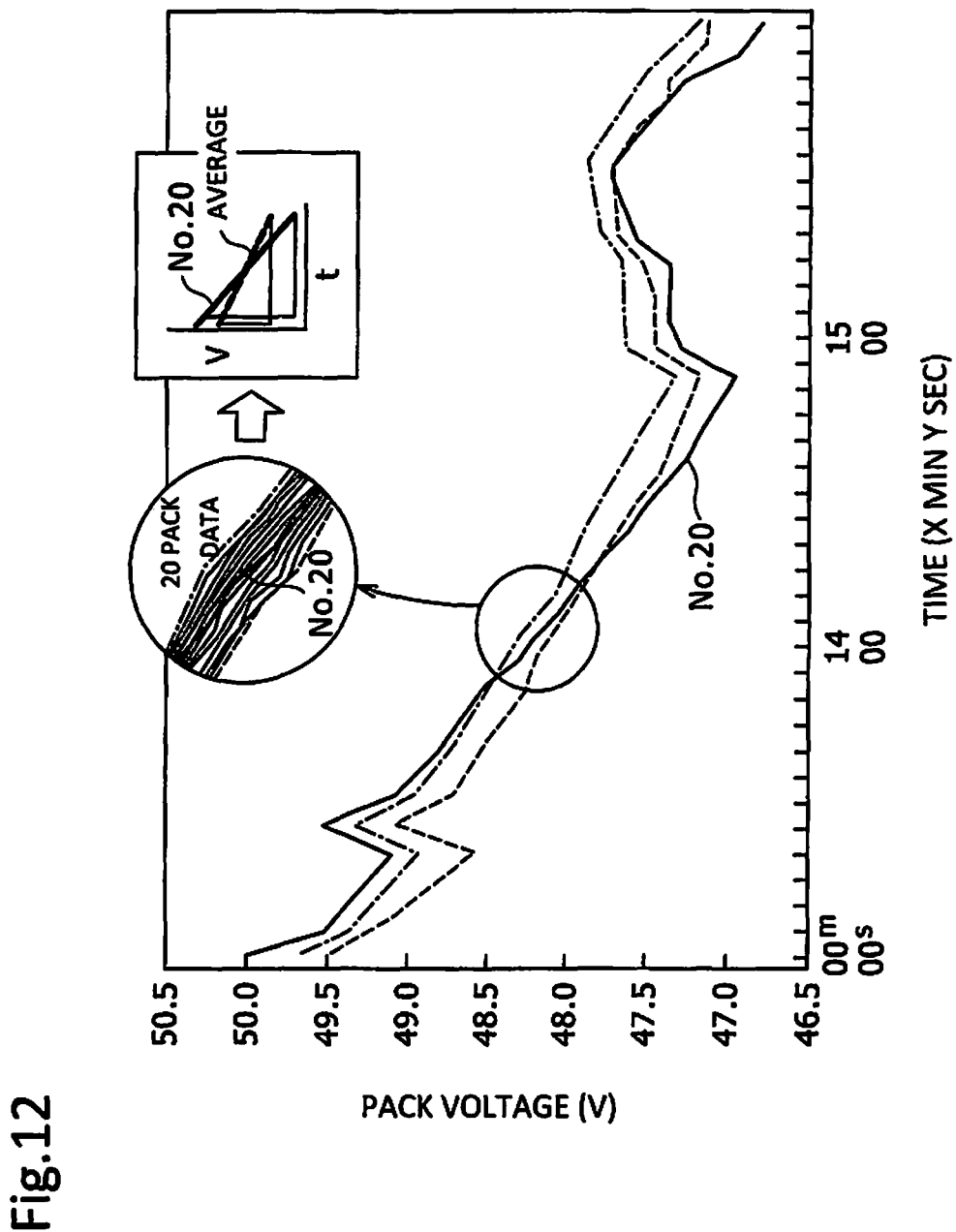
FIG. 12 is a diagram for explaining pack voltage of each of the storage battery packs constituting a storage battery unit in the embodiment.

As described above, if any one of the storage batteries constituting storage battery assembly 50 is faulty, assembly charge-discharge control instruction S5 needs to be created. It is therefore necessary to detect a fault of storage batteries quickly and surely. FIGS. 11 and 12 are diagrams for explaining a method of detecting a fault of storage battery packs 56 constituting each storage battery unit 54 during the operation of storage battery units 54.

FIG. 11 shows a diagram showing time change in voltage of five storage battery packs 56 constituting one of the storage battery pack lines when storage battery assembly 50 is in operation under a predetermined charge-discharge control instruction. The horizontal axis shows time, and the vertical axis shows voltage of each storage battery pack 56, or pack voltage. FIG. 11 reveals that the storage battery packs connected in series have a substantially same pack voltage during operation. This is thought to be because charge/discharge currents flowing through storage battery packs 56 connected in series are equal to each other under the predetermined charge-discharge control instruction.

Next, examination is made for time change in voltage of 20 storage battery packs 56 constituting one of storage battery units 54 when storage battery assembly 50 is in operation under the predetermined charge-discharge control instruction. The results thereof are substantially the same as those of FIG. 11. Most of the pack voltages equally change with time, but one pack voltage abnormally changes with time. FIG. 12 is a diagram showing the same. In FIG. 12, similarly to FIG. 11, the horizontal axis shows time, and the vertical axis shows voltage of each storage battery pack 56, or pack voltage. Since it is difficult to see the data of 20 storage battery packs 56 all at once, FIG. 12 shows only the minimum and maximum pack voltages. FIG. 12 reveals that data of No. 20 is different from the other time change data.

In FIG. 12, a part of the data of 20 storage battery packs 56 is enlarged and shown. This enlarged diagram shows that a voltage changing rate delta V/delta t, which is the rate of pack voltage V changing with charge/discharge elapsed time t, of the storage battery pack 56 of No. 20 is different from that of the other storage battery packs 56. This reveals that abnormal one of storage battery packs 56 can be detected by comparing the voltage changing rates of storage battery packs 56 during the operation under the predetermined charge-discharge control instruction.

Specifically, the voltage changing rate of each storage battery pack 56 is compared with the average of voltage changing rates of multiple storage battery packs 56. Then the storage battery pack 56 having a voltage changing rate exceeding an abnormal predetermined threshold changing rate difference can be determined to be faulty. The above description is about voltage of storage battery packs 56. However, the failure detection can be carried out using the voltage of each storage battery unit 54, the voltage of each storage battery pack line, or the voltage of each unit cell. Generally, it is possible to use the changing rate of a voltage of each replacement unit of storage battery with respect to the charge/discharge elapsed time. A defective storage battery can be thus detected.

Figure 13:
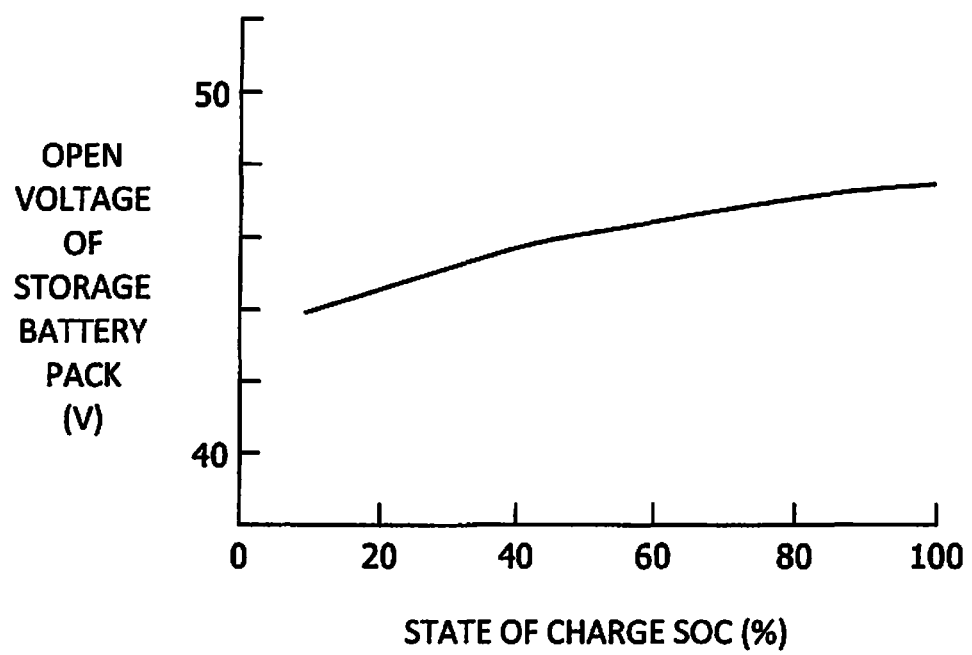
FIG. 13 is a diagram for explaining a relation between open voltage and a state of charge of a storage battery pack in the embodiment.

FIG. 13 is a diagram showing a relation between the open voltage and the state of charge of the storage battery packs. As shown in the diagram, the open voltage substantially linearly changes with the state of charge. The state of charge is calculated using such a relation between the state of charge and the open voltage based on data of the voltage, internal resistance, and charge/discharge current of storage batteries.

Figure 14:
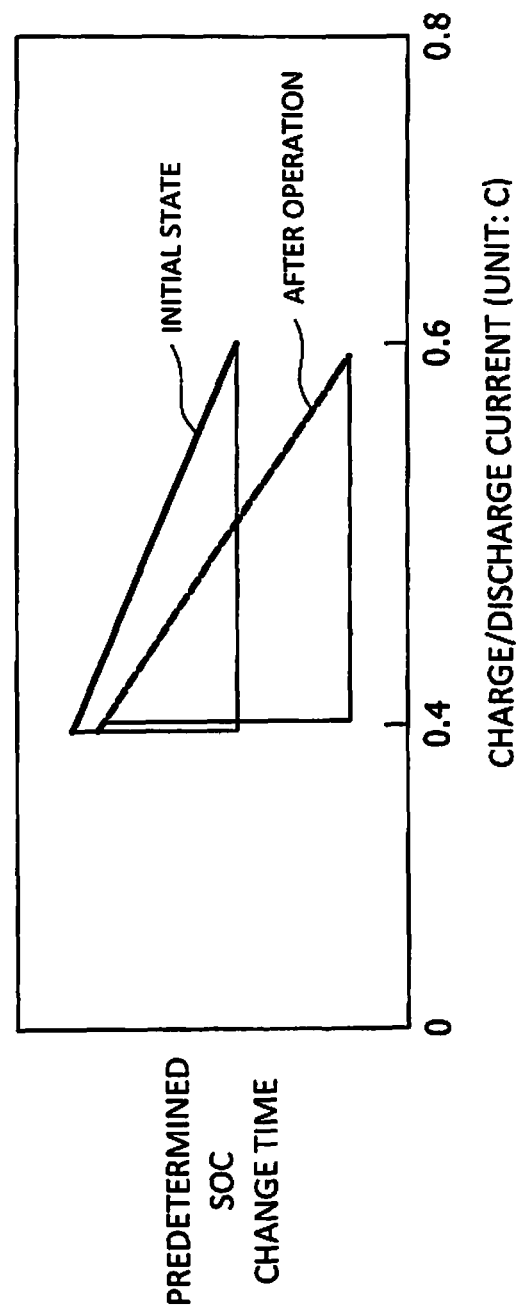
FIG. 14 is a diagram for explaining how to distinguish a deteriorated storage battery pack in the embodiment.

FIG. 14 is a diagram for explaining detection of a deteriorated storage battery by regular inspection using a predetermined test charge-discharge control instruction. The full charge capacity of storage batteries decreases from the initial state with repeated charge and discharge. This is called deterioration. The deterioration can be detected as a change in the state of charge. Specifically, the time for the state of charge to change under a predetermined range of charge/discharge current is measured. As a storage battery deteriorates, the storage battery requires a shorter time to change the state of charge thereof by a predetermined state-of-charge range.

FIG. 14 shows that the characteristic of a storage battery at the initial state is different from the characteristic thereof after the operation of repeated charge and discharge. Herein, the horizontal axis shows lapsed time, and the vertical axis shows SOC. As for the unit of charge/discharge current on the horizontal axis, a current needed to fully charge the storage battery within one hour or a current which increases the state of charge SOC to 100(percent) within one hour is set as 1C (C stands for capacity). The predetermined SOC change time can be set to be time taken for the SOC to increase from 40(percent) to 60(percent), for example. As shown in FIG. 14, the time taken for the SOC to change is shorter after the operation including repeated change and discharge.

Accordingly, the degree of deterioration of each storage battery pack can be determined by examining the SOC change time of each storage battery pack 56, which is the time taken for the SOC to change by the predetermined SOC range, using the test charge-discharge control instruction to apply the predetermined charge/discharge current. Specifically, the SOC change time of each storage battery pack 56 is compared with a predetermined deterioration threshold change time. The storage battery pack 56 having an SOC change time smaller than the deterioration threshold change time is determined to be deteriorated. The SOC of each storage battery pack 56 may be replaced with the SOC of each storage battery unit 54, the SOC of each storage battery pack line, and the SOC of each unit cell. Generally, deterioration of a replacement of unit storage battery can be detected using the state of charge of the replacement of unit storage battery. In such a manner, a deteriorated storage battery can be detected.

In the above description, power converter management data S7 is transmitted every 1 sec from master controller 32 to the power management apparatus 17 as described in relation to FIG. 2. Moreover, unit state data S6 is transmitted every 10 sec from each sub-controller 38 to power management apparatus 17. If power management apparatus 17 is shut down for some reason and cannot perform transmission or reception, the power converter management data not transmitted is accumulated in master controller 32, and the unit state data not transmitted is accumulated in sub-controllers 38. The accumulated data is transmitted when the function of power management apparatus 17 is restored.

Both master controller 32 and sub-controllers 38 have limited data storage capacities. Furthermore, even if the function of power management apparatus 17 is restored, transmission of the accumulated data all at once exceeds the transmission reception ability in some cases. If the data not transmitted is excessively accumulated, the data needs to be organized. The data organization is shown in FIG. 15. Herein, using sub-controller 38 as an example, the size of the data storage capacity 120 thereof is represented by rectangular masses, and amount 122 of data not transmitted is represented by areas of horizontal stripe regions. The following description is similarly applied to master controller 32.

When transmission and reception between sub-controller 38 and power management apparatus 17 are normally performed, as shown in upper (a), (b), and (c) in FIG. 15, amount 122 of data not transmitted repeatedly increases and decreases and does not exceed data storage capacity 120. When data reception by power management apparatus 17 fails, as shown in lower (b), (d), and (e) in FIG. 15, amount 122 of untransmitted data increases and reaches data storage capacity 120. If power management apparatus 17 continues failing in data transmission, as shown in (f), amount 122 of untransmitted data exceeds data storage capacity 120. At that time, amount 124 of untransmitted data equal to data storage capacity 120 can be stored, but excess amount 126 of untransmitted data over data storage capacity 120 cannot be stored.

Accordingly, excess amount 126 of untransmitted data over the limit of the data storage capacity needs to be organized. The processing procedure thereof can be performed in the following manner. Sub-controller 38 determines the presence of a failure in power management apparatus 17 based on whether the data reception by power management apparatus 17 is normally performed. If it is determined that the power electric management apparatus 17 has a failure, the data which is not transmitted to power management apparatus 17 is organized according to the predetermined data processing criteria during the failure period of power management apparatus 17.

One of such data processing criteria is used as follows. The data not transmitted to power management apparatus 17 is accumulated up to the predetermined limit of data storage capacity 120. When the amount of data not transmitted to power management apparatus 17 exceeds the limit of data storage capacity 120, data is deleted in chronological order.

Using another data processing standard, the data can be deleted in ascending order of predetermined data importance when the amount of data not transmitted to power management apparatus 17 exceeds the limit of data storage capacity 120. The order of data importance can be an order of pack voltage, pack line current, battery temperature, or cell voltage. Furthermore, if some sets of data have a same importance, the sets can be narrowed down to only a representative set.

With still another data processing standard, when the amount of data not transmitted to power management apparatus 17 exceeds the limit of data storage capacity 120, the data is stored in chronological order to a backup memory device newly provided. In this case, it is preferable that the name of the data is changed in order to easily find that the data is old.

With still another data processing standard, when the amount of data not transmitted to power management apparatus 17 exceeds the limit of data storage capacity 120, the data is, in chronological order, transmitted to and stored in a memory device of system controller 22. System controller 22 provides a higher performance than master controller 32 and sub-controller 38 and has a larger storage capacity. System controller 22 can be therefore used for temporary data storage.

As described above, even if power management apparatus 17 fails, the amount of data accumulated in master controller 32 and sub-controllers 38 can be organized while data necessary for charge-discharge control is ensured. It is therefore possible to prevent a large amount of data from being transmitted beyond the transmission and reception ability when the function of power management apparatus 17 is restored.

With the aforementioned configuration, the system controller creates one charge-discharge control instruction for the entire power management system and transmits the same to the hierarchical charge-discharge control apparatus. Accordingly, even when electric power handled is of large scale, charge and discharge of storage batteries can be controlled according to the power requirement of load through one overall charge-discharge control instruction.

As described above, according to the aforementioned embodiment, it is possible to provide a power management system capable of controlling charge and discharge of storage batteries according to the power requirement of load even if the handled electric power is of large-scale.

The invention includes embodiments other than the above-described embodiments without departing from the spirit thereof. The embodiments are to describe the invention and do not limit the scope thereof. The scope of the invention is indicated by the description of claims and is not indicated by the description of the specification. Accordingly, the invention includes all the modes including the meaning and scope of the equivalents of the claims. The entire contents of Japanese Patent Applications Nos. P2010-1806226 entitled "POWER MANAGEMENT SYSTEM" filed on Aug. 23, 2010 and P2011-067379 entitled "POWER MANAGEMENT SYSTEM" filed on Mar. 25, 2011 are incorporated herein by reference.

The power management system according to the invention can be used for power management in facilities provided with a storage battery assembly.

What is claimed is:

1. A power management system comprising:
a system controller configured to receive load-related information data including power requirement of a load and storage battery-related information data including state of a storage battery assembly including a plurality of storage batteries and to create an overall charge-discharge control instruction for an entire power management system based on the load-related information data and the storage battery-related information data;
a hierarchical charge-discharge control apparatus configured to receive the overall charge-discharge control instruction from the system controller and to perform charge-discharge control of the plurality of storage batteries, which are classified into a plurality of hierarchical levels, on a hierarchical level basis; and
a plurality of power converters configured to perform electric power conversion among a power source electrically connectable to the power management system, the storage battery assembly, and the load, wherein
the hierarchical levels of the storage battery assembly comprise:
level of a storage battery unit including a predetermined number of storage battery packs arranged in an array, each storage battery pack including a plurality of storage battery unit cells; and
level of a unit group including a predetermined number of storage battery units arranged and connected to each of the plurality of power converters, the unit groups correspondingly assigned to the plurality of power converters, respectively,
the hierarchical charge-discharge control apparatus comprises:
a master controller configured to receive an overall charge-discharge control instruction from the system controller and to create an assembly charge-discharge control instruction of the storage battery assembly based on the overall charge-discharge control instruction; and
a power converter manager configured to receive the assembly charge-discharge control instruction and to perform charge-discharge control for each of the plurality of power converters by controlling charge-discharge of the storage battery units belonging to the unit group corresponding to each power converter.

2. The power management system of claim 1, further comprising:
a sub-controller configured to control charge-discharge of each of the storage battery units connected to the power converters controlled by the power converter manager.

3. The power management system of claim 2, wherein the master controller
receives power converter management data as state data of the power converters from the power converter manager,
receives unit state data as state data of each storage battery unit from the sub-controller,
determines whether the overall charge-discharge control instruction is executable, based on the received power converter management data and unit state data, and
transmits the assembly charge-discharge control instruction to the power converter manager on the basis of a result of the determination.

4. The power management system of claim 3, wherein the master controller transmits an activation check signal to check whether the system controller is in operation to the system controller at predetermined intervals.

5. The power management system of claim 4, wherein each of the storage battery units includes a predetermined number of storage battery pack lines connected in parallel to one another, each of the storage battery pack lines including a predetermined number of the storage battery packs connected in series, and
the sub-controller comprises
a plurality of switches each of which is connected and placed between the corresponding power converter and one of the storage battery pack lines constituting each storage battery unit, and
acquires pack state data as state data of each of the storage battery packs constituting each storage battery unit and controls operations of the switches on the basis of the acquired pack state data.

6. The power management system of claim 5, further comprising:
a storage battery power management apparatus configured to acquire the storage battery-related information data including the state data of the storage battery assembly; and
a load power management apparatus configured to acquire the load-related information data on the power requirement of the load.

7. The power management system of claim 6, wherein the sub-controller transmits the unit state data of each of the storage battery units based on the acquired pack state data to the master controller and the storage battery power management apparatus.

8. The power management system of claim 6, wherein
the storage battery power management apparatus receives the power converter state data as the power converter management data from the master controller, and sends the system controller the received power converter state data as the storage battery-related information, together with the unit state data transmitted from the sub-controller.

9. The power management system of claim 1, further comprising
a storage battery assembly including a plurality of storage batteries.

10. The power management system of claim 2, further comprising:
a fault determination unit configured to determine whether the master controller is faulty based on whether communication performed by the master controller remains abnormal for more than a predetermined threshold margin period; and
a substitution unit configured to substitute the master controller with one of a plurality of the sub-controllers according to a predetermined substitute specifying criterion when the fault determination unit determines that the master controller is faulty.

11. The power management system of claim 10, wherein
the substitution unit uses a state of charge of each of the storage battery units managed by the sub-controllers as the substitute specifying criterion, and substitutes the master controller with the sub-controller in charge of one of the plurality of storage battery units having the highest state of charge.

12. The power management system of claim 10, wherein
the substitution unit uses a predetermined rotation order as the substitute specifying criterion and substitutes the master controller with one of the sub-controllers in a predetermined order of rotation at each predetermined substitution period.

13. The power management system of claim 3, wherein
the master controller changes the assembly charge-discharge control instruction according to state data of the plurality of power converters without changing the content of the overall charge-discharge control instruction and sends the assembly charge-discharge control instruction to the power converter manager.

14. The power management system of claim 6, wherein
the master controller comprises:
a unit configured to calculate a storage battery replacement unit voltage which is a voltage of a replacement of unit storage battery on the basis of the unit state data transmitted from the sub-controller under the predetermined assembly charge-discharge control instruction and to calculate a voltage changing rate which is a change in the storage battery replacement unit voltage over charge-discharge elapsed time; and
an abnormal storage battery detection unit configured to compare an average of the voltage changing rates of a plurality of the replacement units of storage battery with the voltage changing rate of each of the replacement units of storage battery and determine that a replacement of unit storage battery having the voltage changing rate exceeding a predetermined abnormal threshold changing rate difference is an abnormal replacement of unit storage battery.

15. The power management system of claim 6, wherein the master controller comprises:
a unit configured to use as a predetermined test charge-discharge control instruction the assembly charge-discharge control instruction, calculate a state of charge of a replacement of unit storage battery based on the unit state data transmitted from the sub-controller under the test charge-discharge control instruction, and calculate a state-of-charge change time which is the time taken for the state of charge to change by a predetermined state-of-charge range; and
a deteriorated storage battery detection unit configured to compare a preset deterioration threshold change time with the state-of-charge change time of each replacement of unit storage battery and determine that a replacement of unit storage battery having the state-of-charge change time shorter than the deterioration threshold change time is a deteriorated replacement of unit storage battery.

16. The power management system of claim 7, wherein
each of the master controller and the sub-controller comprises:
a failure determination unit configured to determine the presence of a failure of the storage battery power management apparatus based on whether data reception performed by the storage battery power management apparatus is normal; and
a data organization unit configured to, when the failure determination unit determines that the storage battery power management apparatus has the failure, organize data not transmitted to the storage battery power management apparatus according to a predetermined data processing standards during a failure period thereof.

17. The power management system of claim 16, wherein
the data organization unit organizes the data by using, as the data processing standard, a standard specifying that data not transmitted to the storage battery power management apparatus is accumulated up to a predetermined limit of data storage capacity, and then is deleted in chronological order when the amount of data not transmitted to the storage battery power management apparatus exceeds the limit of the data storage capacity.

18. The power management system of claim 16, wherein
the data organization unit organizes the data by using, as the data processing standard, a standard specifying that the data is deleted in ascending order of predetermined data importance when the amount of data not transmitted to the storage battery power management apparatus exceeds the limit of the data storage capacity.

19. The power management system of claim 16, wherein
the data organization unit organizes the data by using, as the data processing standard, a standard specifying that the data is accumulated in a newly provided backup memory device in chronological order when the amount of data not transmitted to the storage battery power management apparatus exceeds the limit of the data storage capacity.

20. The power management system of claim 16, wherein
the data organization unit organizes the data by using, as the data processing standard, a standard specifying that the data is, in chronological order, transmitted to and stored in a memory device of the system controller, when the amount of data not transmitted to the storage battery power management apparatus exceeds the limit of the data storage capacity.

* * * * *